United States Patent
Krueger

(10) Patent No.: US 10,649,678 B2
(45) Date of Patent: May 12, 2020

(54) PARTITIONING OF MEMORY SYSTEM RESOURCES OR PERFORMANCE MONITORING

(71) Applicant: ARM Limited, Cambridge (GB)

(72) Inventor: Steven Douglas Krueger, Austin, TX (US)

(73) Assignee: ARM Limited, Cambridge (GB)

( * ) Notice: Subject to any disclaimer, the term of this patent is extended or adjusted under 35 U.S.C. 154(b) by 344 days.

(21) Appl. No.: 15/405,572

(22) Filed: Jan. 13, 2017

(65) Prior Publication Data
US 2018/0203638 A1    Jul. 19, 2018

(51) Int. Cl.
*G06F 3/06* (2006.01)
*G06F 9/46* (2006.01)
(Continued)

(52) U.S. Cl.
CPC .......... *G06F 3/0644* (2013.01); *G06F 3/0604* (2013.01); *G06F 3/0631* (2013.01);
(Continued)

(58) Field of Classification Search
CPC .... G06F 3/0604; G06F 3/0631; G06F 3/0644; G06F 3/0653; G06F 3/0659;
(Continued)

(56) References Cited

U.S. PATENT DOCUMENTS

| 4,376,297 A | 3/1983 | Anderson |
| 5,404,476 A | 4/1995 | Kadaira |

(Continued)

FOREIGN PATENT DOCUMENTS

| FR | 3 019 921 | 10/2015 |
| GB | 2 421 821 | 7/2006 |

(Continued)

OTHER PUBLICATIONS

Final Office Action dated Dec. 14, 2018 in co-pending U.S. Appl. No. 15/405,661, 24 pages.
(Continued)

*Primary Examiner* — Aracelis Ruiz
(74) *Attorney, Agent, or Firm* — Nixon & Vanderhye P.C.

(57) ABSTRACT

An apparatus comprises partition identifier storage storing an instruction partition identifier and a data partition identifier. When issuing a memory transaction for accessing data, the transaction is issued specifying a partition identifier depending on the data partition identifier, while when the memory transaction is for accessing an instruction, the transaction specifies a partition identifier depending on the instruction partition identifier. A memory system component selects one of a number of sets of memory system component parameters in dependence on the partition identifier specified by a memory transaction to be handled. The memory system component controls allocation of resources for handling the memory transaction or manages contention for the resources in dependence on the selected set of parameters, or updates performance monitoring data specified by the selected set of parameters in response to handling of said memory transaction.

10 Claims, 17 Drawing Sheets

(51) Int. Cl.
  *G06F 9/52* (2006.01)
  *G06F 9/50* (2006.01)
  *G06F 12/1045* (2016.01)

(52) U.S. Cl.
  CPC .......... *G06F 3/0653* (2013.01); *G06F 3/0659* (2013.01); *G06F 3/0685* (2013.01); *G06F 9/467* (2013.01); *G06F 9/5016* (2013.01); *G06F 9/528* (2013.01); *G06F 12/1045* (2013.01); *G06F 2212/1021* (2013.01); *G06F 2212/684* (2013.01)

(58) Field of Classification Search
  CPC ...... G06F 3/0685; G06F 9/467; G06F 9/5016; G06F 9/528; G06F 12/1045; G06F 2212/1021; G06F 2212/684
  See application file for complete search history.

(56) References Cited

U.S. PATENT DOCUMENTS

| | | |
|---|---|---|
| 5,790,979 A | 8/1998 | Liedtke |
| 5,796,978 A | 8/1998 | Yoshioka |
| 5,924,127 A | 7/1999 | Kawamoto |
| 6,629,220 B1 | 9/2003 | Dyer |
| 9,172,655 B1 | 10/2015 | Dropps |
| 2005/0055510 A1 | 3/2005 | Hass et al. |
| 2006/0136639 A1 | 6/2006 | Futral |
| 2009/0083520 A1* | 3/2009 | Kanemura .......... G06F 12/1458 712/43 |
| 2009/0282405 A1 | 11/2009 | Moir et al. |
| 2009/0327646 A1 | 12/2009 | Jordan et al. |
| 2010/0058026 A1 | 3/2010 | Heil |
| 2010/0306499 A1* | 12/2010 | Petolino, Jr. ........ G06F 12/1027 711/207 |
| 2011/0145512 A1 | 6/2011 | Adl-Tabatabai et al. |
| 2013/0013889 A1 | 1/2013 | Devaraj et al. |
| 2013/0076768 A1 | 3/2013 | Chakraborty et al. |
| 2013/0179892 A1 | 7/2013 | Frazier |
| 2014/0101306 A1 | 4/2014 | Murgia |
| 2014/0101340 A1 | 4/2014 | Jandhyam |
| 2014/0123146 A1 | 5/2014 | Barrow-Williams |
| 2014/0181821 A1 | 6/2014 | Shavit et al. |
| 2014/0195743 A1 | 7/2014 | Fleischer |
| 2015/0039763 A1 | 2/2015 | Chaudhary |
| 2015/0089153 A1 | 3/2015 | Busaba et al. |
| 2015/0089185 A1 | 3/2015 | Brandyberry |
| 2015/0242214 A1 | 8/2015 | Busaba et al. |
| 2015/0242218 A1 | 8/2015 | Shum et al. |
| 2015/0242248 A1 | 8/2015 | Busaba et al. |
| 2015/0301951 A1 | 10/2015 | Bybell |
| 2015/0301953 A1 | 10/2015 | Bybell |
| 2015/0347138 A1 | 12/2015 | Gschwind et al. |
| 2017/0010968 A1 | 1/2017 | Li |
| 2018/0157601 A1 | 6/2018 | Bryant |

FOREIGN PATENT DOCUMENTS

| | | |
|---|---|---|
| GB | 2 539 429 | 12/2016 |
| GB | 2 539 433 | 12/2016 |
| GB | 2 539 435 | 12/2016 |
| GB | 2 539 436 | 12/2016 |
| WO | 2005/036405 | 4/2005 |
| WO | 2014/122415 | 8/2014 |
| WO | 2016/196855 | 12/2016 |

OTHER PUBLICATIONS

U.S. Appl. No. 15/646,406, filed Jul. 11, 2017; Inventor: Swaine.
International Search Report and Written Opinion of the International Searching Authority dated Mar. 13, 2018 in PCT/GB2017/053661, 18 pages.
C. Jacobi et al, "Transactional Memory Architecture and Implementation for IBM System z" *2012 IEEE/ACM 45th Annual International Symposium on Microarchitecture*, Dec. 1, 2012, pp. 25-36.
W. Zhao et al, "Dynamic Memory Balancing for Virtual Machines" *VEE'09 Proceedings of the 2009 ACM SIGPLAN/SIGOPS International Conference on Virtual Execution Environments*, Mar. 11-13, 2009, pp. 21-.
International Search Report and Written Opinion of the International Searching Authority dated Mar. 21, 2018 in PCT/GB2017/053662, 15 pages.
Partial International Search Report and Invitation to Pay Additional Fees dated Feb. 26, 2018 in PCT/GB2017/053663, 13 pages.
International Search Report and Written Opinion of the International Searching Authority dated Mar. 21, 2018 in PCT/GB2017/053664, 15 pages.
International Search Report and Written Opinion of the International Searching Authority dated Mar. 21, 2018 in PCT/GB2017/053680, 14 pages.
Office Action dated May 17, 2018 in co-pending U.S. Appl. No. 15/405,691, 25 pages.
U.S. Appl. No. 15/405,661, filed Jan. 13, 2017; Inventor: Krueger.
U.S. Appl. No. 15/405,691, filed Jan. 13, 2017; Inventor: Krueger.
U.S. Appl. No. 15/405,563, filed Jan. 13, 2017; Inventor: Krueger.
U.S. Appl. No. 15/405,625, filed Jan. 13, 2017; Inventor: Krueger.
Intel Corporation, "Improving Real-Time Performance by Utilizing Cache Allocation Technology—Enhancing Performance via Allocation of the Processor's Cache" White Paper, Apr. 2015, pp. 1-16.
N. Khang (Intel), "Benefits of Intel® Cache Monitoring Technology in the Intel® Processor E5 v3 Family" https://software.intel.com/en-us/blogs/2014/06/18/benefit-of-cache-monitoring, Sep. 8, 2014, 2 pages.
N. Khang (Intel), "Introduction to Cache Allocation Technology in the Intel® Xeon® Processor E5 v4 Family" https://software.intel.com/en-us/articles/introduction-to-cache-allocation-technology, Feb. 11, 2016, 4 pages.
N. Khang (Intel), "Introduction to Memory Bandwidth Monitoring in the Intel® Xeon® Processor E5 v4 Family" https://software.intel.com/en-us/articles/introduction-to-memory-bandwidth-monitoring, Feb. 11, 2016, 3 pages.
Office Action dated May 4, 2018 in co-pending U.S. Appl. No. 15/405,661, 22 pages.
Office Action dated Oct. 30, 2018 in co-pending U.S. Appl. No. 15/646,406, 24 pages.
S. Groesbrink et al, "Modular Paging with Dynamic TLB Partitioning for Embedded Real-Time Systems" IEEE, SIES 2008, Jun. 2008, pp. 261-264.
Office Action dated Jun. 3, 2019 in co-pending U.S. Appl. No. 15/646,406, 20 pages.
Channon et al, "Performance Analysis of Re-configurable Partitioned TLBs" 1997, IEEE, HICSS 1997, pp. 168-177.
Office Action dated Jun. 13, 2019 in co-pending U.S. Appl. No. 15/405,563, 20 pages.
Final Office Action dated Feb. 13, 2019 in co-pending U.S. Appl. No. 15/646,406, 21 pages.
Office Action dated Mar. 7, 2019 in co-pending U.S. Appl. No. 15/405,625, 30 pages.
Final Office Action dated Oct. 11, 2019 in co-pending U.S. Appl. No. 15/646,406, 25 pages.

* cited by examiner

PARTITIONING OF MEMORY SYSTEM RESOURCES OR PERFORMANCE MONITORING

BACKGROUND

Technical Field

The present technique relates to the field of data processing.

Technical Background

Two or more software execution environments, such as applications or virtual machines, may be executed on the same data processing system with access to a common memory system shared between software execution environments. For some systems it may be important that the performance of one software execution environment is not held back due to another software execution environments using too much resource in the shared memory system. This problem can be referred to as the "noisy neighbour" problem and can be particularly significant for enterprise networking or server systems for example.

SUMMARY

At least some examples provide an apparatus comprising:
processing circuitry to process instructions;
at least one memory system component to handle memory transactions for accessing data; and
partition identifier storage to store an instruction partition identifier and a data partition identifier;
wherein when issuing a memory transaction for accessing data, the processing circuitry is configured to issue the memory transaction specifying a partition identifier dependent on the data partition identifier stored in the partition identifier storage;
when issuing a memory transaction for accessing an instruction, the processing circuitry is configured to issue the memory transaction specifying a partition identifier dependent on the instruction partition identifier stored in the partition identifier storage; and
in response to a memory transaction to be handled, said at least one memory system component is configured to control allocation of resources for handling the memory transaction or manage contention for said resources in dependence on a selected set of memory system component parameters selected in dependence on the partition identifier specified by the memory transaction, or to control, in dependence on said partition identifier, whether performance monitoring data is updated in response to the memory transaction.

At least some examples provide an apparatus comprising:
means for processing instructions;
means for handling memory transactions for accessing data; and
means for storing an instruction partition identifier and a data partition identifier;
wherein when issuing a memory transaction for accessing data, the means for processing is configured to issue the memory transaction specifying a partition identifier dependent on the data partition identifier stored in the means for storing;
when issuing a memory transaction for accessing an instruction, the means for processing circuitry is configured to issue the memory transaction specifying a partition identifier dependent on the instruction partition identifier stored in the means for storing; and
in response to a memory transaction to be handled, said means for handling memory transactions is configured to control allocation of resources for handling the memory transaction or manage contention for said resources in dependence on a selected set of memory system component parameters selected in dependence on the partition identifier specified by the memory transaction, or to control, in dependence on said partition identifier, whether performance monitoring data is updated in response to the memory transaction.

At least some examples provide a data processing method comprising:
processing instructions;
storing an instruction partition identifier and a data partition identifier in partition identifier storage;
issuing a memory transaction to at least one memory system component, the memory transaction specifying a partition identifier dependent on the instruction partition identifier when the memory transaction is for accessing an instruction and dependent on the data partition identifier when the memory transaction is for accessing data; and
in response to a memory transaction to be handled, said at least one memory system component controlling allocation of resources for handling the memory transaction or managing contention for said resources in dependence on a selected set of memory system component parameters selected in dependence on the partition identifier specified by the memory transaction, or controlling, in dependence on said partition identifier, whether performance monitoring data is updated in response to the memory transaction.

Further aspects, features and advantages of the present technique will be apparent from the following description of examples, which is to be read in conjunction with the accompanying drawings.

DESCRIPTION OF EXAMPLES

Figure 1:
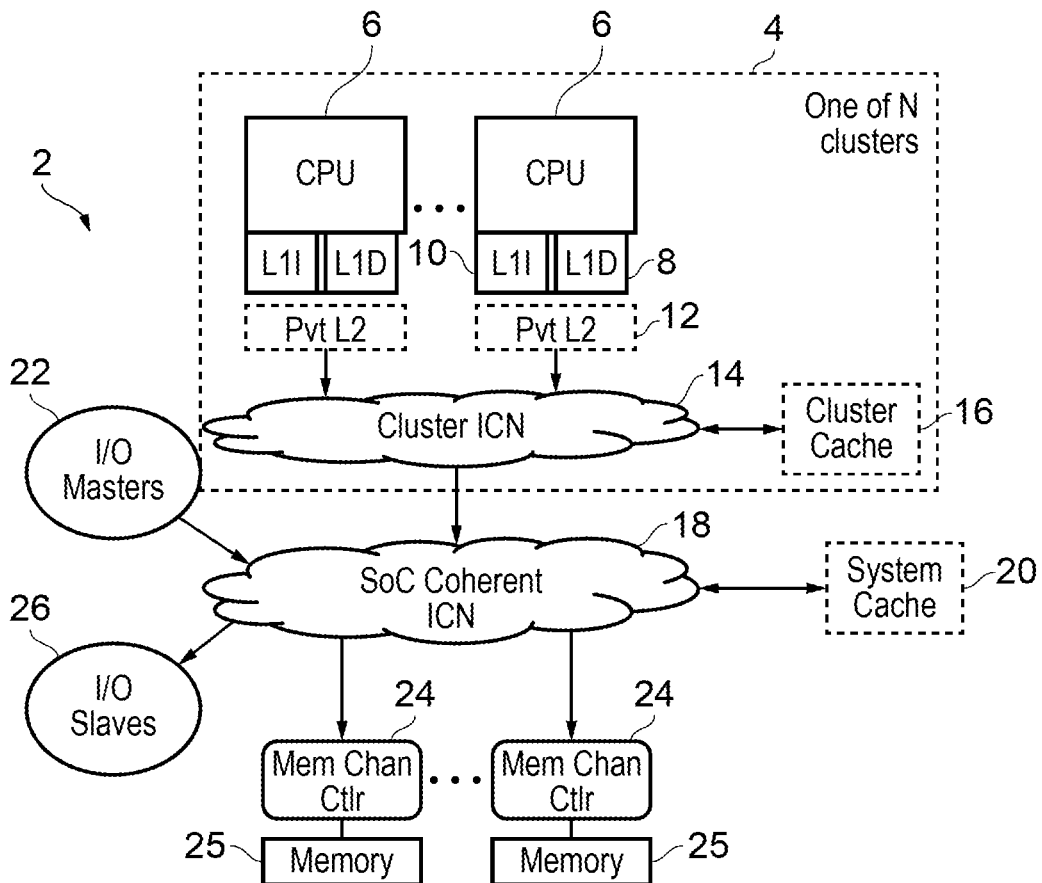
FIG. 1 schematically illustrates an example of a data processing system comprising a memory system.

FIG. 1 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster interconnect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transactions to other slave devices, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system components may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment using more than its fair share of resource, to prevent other execution environments perceiving a loss of performance. This can be particularly important for data centre (server) applications where there is an increasing demand to reduce capital expenditure by increasing the number of independent software processes which interact with a given amount of memory capacity, to increase utilisation of the data centre servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions.

Figure 2:
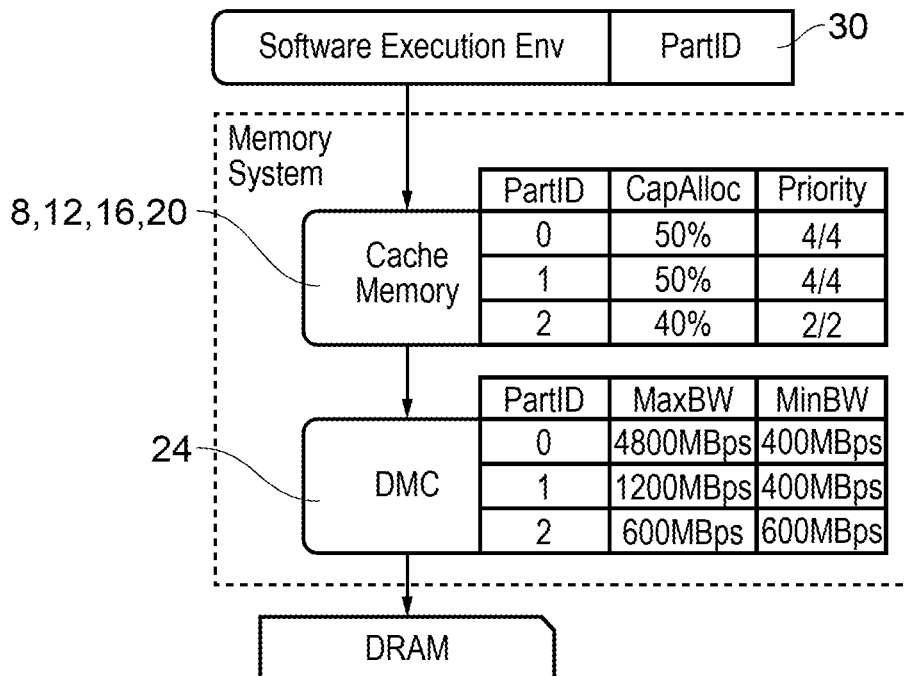
FIG. 2 schematically illustrates an example of partitioning control of memory system resources in dependence on a partition identifier allocated to a software execution environment associated with a memory transaction.

FIG. 2 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 2, each software execution environment may be allocated a given partition identifier 30 which is passed to the memory system components along with memory transactions that are associated with that software execution environment.

Within the memory system component, resource allocation or contention resolution operations can be controlled based on one of a number of sets of memory system component parameters selected based on the partition identifier. For example, as shown in FIG. 2, each software execution environment may be assigned an allocation threshold representing a maximum amount of cache capacity that can be allocated for data/instructions associated with that software execution environment, with the relevant allocation threshold when servicing a given transaction being selected based on the partition identifier associated with the transaction. For example, in FIG. 2 transactions associated with partition identifier 0 may allocate data to up to 50% of the cache's storage capacity, leaving at least 50% of the cache available for other purposes.

Similarly, in a memory system component such as the memory controller 24 which has a finite amount of bandwidth available for servicing memory transactions, minimum and/or maximum bandwidth thresholds may be specified for each partition identifier. A memory transaction associated with a given partition identifier can be prioritised if, within a given period of time, memory transactions specifying that partition identifier have used less than the minimum amount of bandwidth, while a reduced priority can be used for a memory transaction if the maximum bandwidth has already been used or exceeded for transactions specifying the same partition identifier.

These control schemes will be discussed in more detail below. It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Similarly, the partition identifier associated with memory transactions can be used to partition performance monitoring within the memory system, so that separate sets of performance monitoring data can be tracked for each partition identifier, to allow information specific to a given software execution environment (or group of software execution environments) to be identified so that the source of potential performance interactions can be identified more easily than if performance monitoring data was recorded across all software execution environments as a whole. This can also help diagnose potential performance interaction effects and help with identification of possible solutions.

An architecture is discussed below for controlling the setting of partition identifiers, labelling of memory transactions based on the partition identifier set for a corresponding software execution environment, routing the partition identifiers through the memory system, and providing partition-based controls at a memory system component in the memory system. This architecture is scalable to a wide range of uses for the partition identifiers. The use of the partition identifiers is intended to layer over the existing architectural semantics of the memory system without changing them, and so addressing, coherence and any required ordering of memory transactions imposed by the particular memory protocol being used by the memory system would not be affected by the resource/performance monitoring partitioning. When controlling resource allocation using the partition identifiers, while this may affect the performance achieved when servicing memory transactions for a given software execution environment, it does not affect the result of an architecturally valid computation. That is, the partition identifier does not change the outcome or result of the memory transaction (e.g. what data is accessed), but merely affects the timing or performance achieved for that memory transaction.

Figure 3:
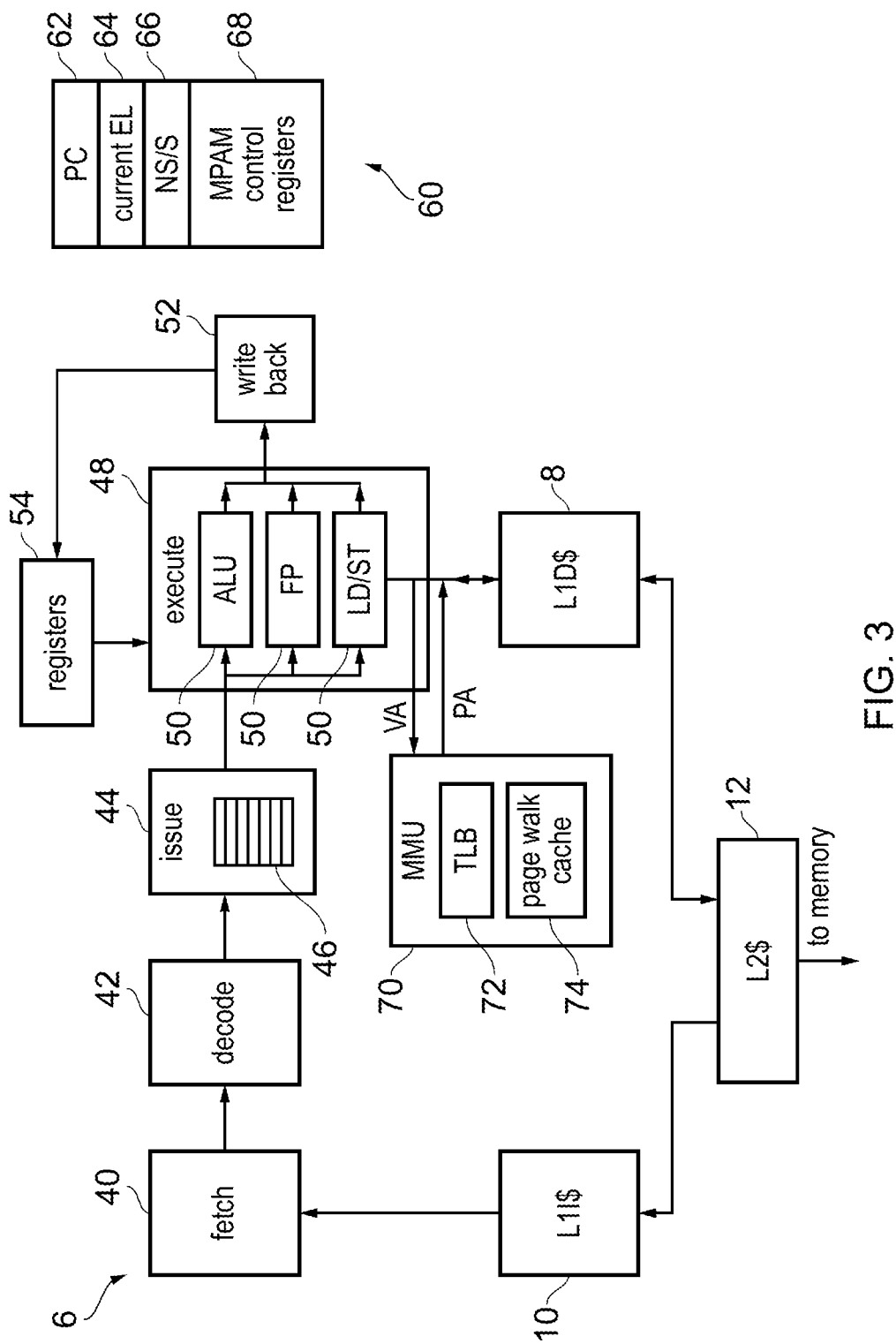
FIG. 3 schematically illustrates an example of processing circuitry for issuing memory transactions specifying a partition identifier.

FIG. 3 schematically illustrates an example of the processing unit 6 in more detail. The processor includes a processing pipeline including a number of pipeline stages, including a fetch stage 40 for fetching instructions from the instruction cache 10, a decode stage 42 for decoding the fetched instructions, an issue stage 44 comprising an issue queue 46 for queueing instructions while waiting for their operands to become available and issuing the instructions for execution when the operands are available, an execute stage 48 comprising a number of execute units 50 for executing different classes of instructions to perform corresponding processing operations, and a write back stage 52 for writing results of the processing operations to data registers 54. Source operands for the data processing operations may be read from the registers 54 by the execution stage 48. In this example, the execute stage 48 includes an ALU (arithmetic/logic unit) for performing arithmetic or logical operations, a floating point (FP) unit for performing operations using floating-point values and a load/store unit for performing load operations to load data from the memory system into registers 54 or store operations to store data from registers 54 to the memory system. It will be appreciated that these are just some examples of possible execution units and other types could be provided. Similarly, other examples may have different configurations of pipeline stages. For example, in an out-of-order processor, an additional register renaming stage may be provided for remapping architectural register specifiers specified by instructions to physical register specifiers identifying registers 54 provided in hardware, as well as a reorder buffer for tracking the execution and commitment of instructions executed in a different order to the order in which they were fetched from the cache 10. Similarly, other mechanisms not shown in FIG. 1 could still be provided, e.g. branch prediction functionality.

The processor 6 has a number of control registers 60, including for example a program counter register 62 for storing a program counter indicating a current point of execution of the program being executed, an exception level register 64 for storing an indication of a current exception level at which the processor is executing instructions, a security state register 66 for storing an indication of whether the processor is in a non-secure or a secure state, and memory partitioning and monitoring (MPAM) control registers 68 for controlling memory system resource and performance monitoring partitioning (the MPAM control registers are discussed in more detail below). It will be appreciated that other control registers could also be provided.

The processor has a memory management unit (MMU) 70 for controlling access to the memory system in response to memory transactions. For example, when encountering a load or store instruction, the load/store unit issues a corresponding memory transaction specifying a virtual address. The virtual address is provided to the memory management unit (MMU) 70 which translates the virtual address into a physical address using address mapping data stored in a translation lookaside buffer (TLB) 72. Each TLB entry may identify not only the mapping data identifying how to translate the address, but also associated access permission data which defines whether the processor is allowed to read or write to addresses in the corresponding page of the address space. In some examples there may be multiple stages of address translation and so there may be multiple TLBs, for example a stage 1 TLB providing a first stage of translation for mapping the virtual address generated by the load/store unit 50 to an intermediate physical address, and a stage 2 TLB providing a second stage of translation for mapping the intermediate physical address to a physical address used by the memory system to identify the data to be accessed. The mapping data for the stage 1 TLB may be set under control of an operating system, while the mapping data for the stage 2 TLB may be set under control of a hypervisor, for example, to support virtualisation. While FIG. 3 for conciseness shows the MMU being accessed in response to data accesses being triggered by the load/store unit, the MMU may also be accessed when the fetch stage 40 requires fetching of an instruction which is not already stored in the instruction cache 10, or if the instruction cache 10 initiates an instruction prefetch operation to prefetch an instruction into the cache before it is actually required by the fetch stage 40. Hence, virtual addresses of instructions to be executed may similarly be translated into physical addresses using the MMU 70.

In addition to the TLB 72, the MMU may also comprise other types of cache, such as a page walk cache 74 for caching data used for identifying mapping data to be loaded into the TLB during a page table walk. The memory system may store page tables specifying address mapping data for each page of a virtual memory address space. The TLB 72 may cache a subset of those page table entries for a number of recently accessed pages. If the processor issues a memory transaction to a page which does not have corresponding address mapping data stored in the TLB 72, then a page table walk is initiated. This can be relatively slow because there may be multiple levels of page tables to traverse in memory to identify the address mapping entry for the required page. To speed up page table walks, recently accessed page table entries of the page table can be placed in the page walk cache 74. These would typically be page table entries other than the final level page table entry which actually specifies the mapping for the required page. These higher level page table entries would typically specify where other page table entries for corresponding ranges of addresses can be found in memory. By caching at least some levels of the page table traversed in a previous page table walk in the page walk cache 74, page table walks for other addresses sharing the same initial part of the page table walk can be made faster. Alternatively, rather than caching the page table entries themselves, the page walk cache 74 could cache the addresses at which those page table entries can be found in the memory, so that again a given page table entry can be accessed faster than if those addresses had to be identified by first accessing other page table entries in the memory.

Figure 4:
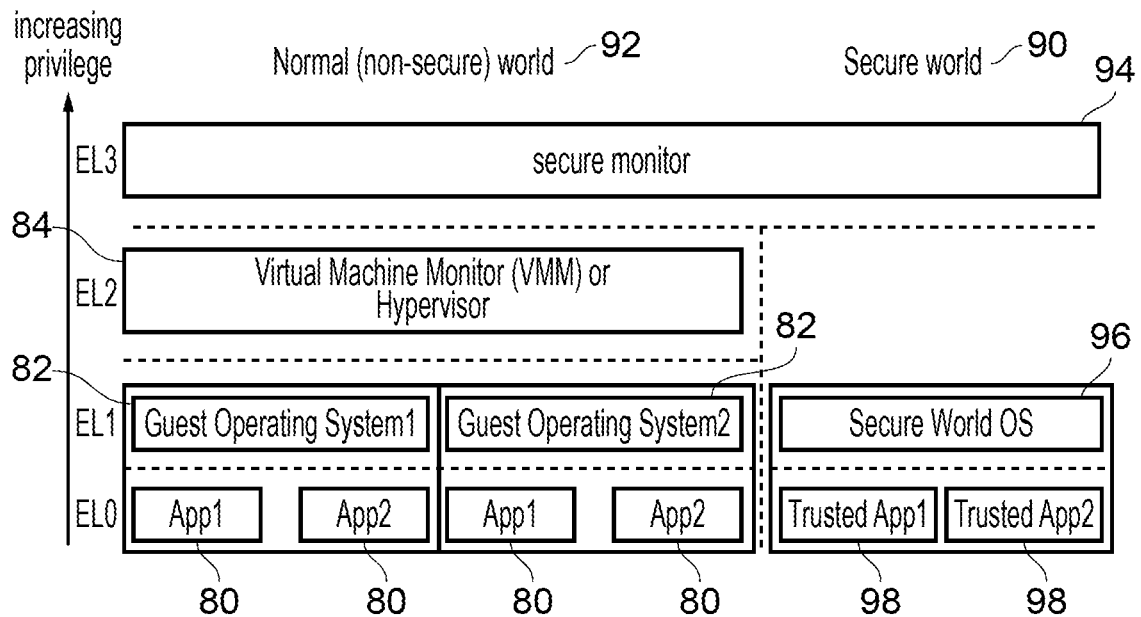
FIG. 4 shows an example of different software execution environments executed by the processing circuitry.

FIG. 4 shows an example of different software execution environments which may be executed by the processor 6. In this example the architecture supports four different exception levels EL0 to EL3 increasing in privilege level (so that EL3 has the highest privilege exception level and EL0 has the lowest privilege exception level). In general, a higher privilege level has greater privilege than a lower privilege level and so can access at least some data and/or carry out some processing operations which are not available to a lower privilege level. Applications 80 are executed at the lowest privilege level EL0. A number of guest operating systems 82 are executed at privilege level EL1 with each guest operating system 82 managing one or more of the applications 80 at EL0. A virtual machine monitor, also known as a hypervisor or a host operating system, 84 is executed at exception level EL2 and manages the virtualisation of the respective guest operating systems 82. Transitions from a lower exception level to a higher exception level may be caused by exception events (e.g. events required to be handled by the hypervisor may cause a transition to EL2), while transitions back to a lower level may be caused by return from handling an exception event. Some types of exception events may be serviced at the same exception level as the level they are taken from, while others may trigger a transition to a higher exception state. The current exception level register 64 indicates which of the exception levels EL0 to EL3 the processing circuitry 6 is currently executing code in.

In this example the system also supports partitioning between a secure domain 90 and a normal (less secure) domain 92. Sensitive data or instructions can be protected by allocating them to memory addresses marked as accessible to the secure domain 90 only, with the processor having hardware mechanisms for ensuring that processes executing in the less secure domain 92 cannot access the data or instructions. For example, the access permissions set in the MMU 70 may control the partitioning between the secure and non secure domains, or alternatively a completely separate security memory management unit may be used to control the security state partitioning, with separate secure and non secure MMUs 70 being provided for sub-control within the respective security states. Transitions between the secure and normal domains 90, 92 may be managed by a secure monitor process 94 executing at the highest privilege level EL3. This allows transitions between domains to be tightly controlled to prevent non-secure operations 80 or operating systems 82 for example accessing data from the secure domain. In other examples, hardware techniques may be used to enforce separation between the security states and police transitions, so that it is possible for code in the normal domain 92 to branch directly to code in the secure domain 90 without transitioning via a separate secure monitor process 94. However, for ease of explanation, the subsequent description below will refer to an example which does use the secure monitor process 94 at EL3. Within the secure domain 90, a secure world operating system 96 executes at exception level EL1 and one or more trusted applications 98 may execute under control of that operating system 96 at exception level EL0. In this example there is no exception level EL2 in the secure domain 90 because virtualisation is not supported in the secure domain, although it would still be possible to provide this if desired. An example of an architecture for supporting such a secure domain 90 may be the Trustzone architecture provided by ARM® Limited of Cambridge, UK. Nevertheless it will be appreciated that other techniques could also be used. Some examples could have more than two security states, providing three or more states with different levels of security associated with them. The security state register 66 indicates whether the current domain is the secure domain 90 or the non-secure 92 and this indicates to the MMU 70 or other control units what access permissions to use to govern whether certain data can be accessed or operations are allowed.

Figure 5:
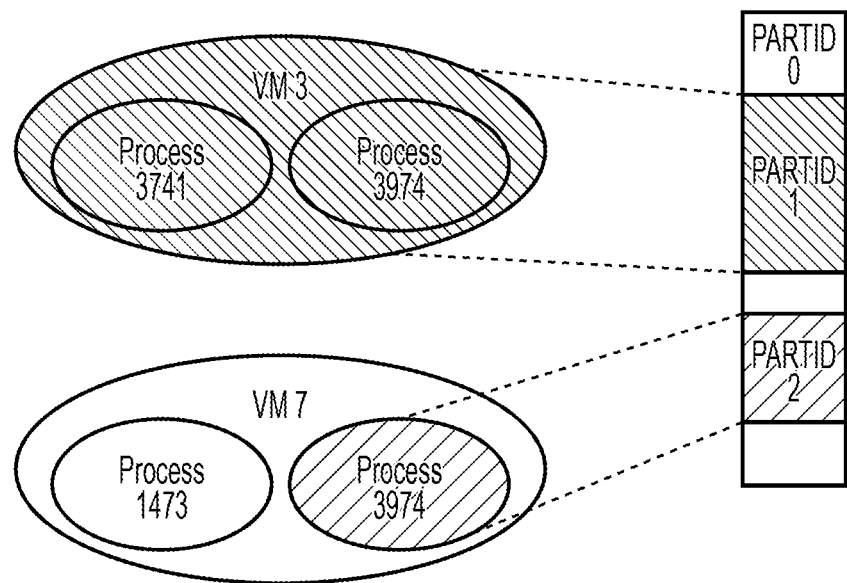
FIG. 5 illustrates an example of allocating partition identifiers to different software execution environments.

Hence, FIG. 4 shows a number of different software execution environments 80, 82, 84, 94, 96, 98 which can be executed on the system. Each of these software execution environments can be allocated a given partition identifier (partition ID or PARTID), or a group of two or more software execution environments may be allocated a common partition ID. In some cases, individual parts of a single processes (e.g. different functions or sub-routines) can be regarded as separate execution environments and allocated separate partition IDs. For example, FIG. 5 shows an example where virtual machine VM 3 and the two applications 3741, 3974 executing under it are all allocated PARTID 1, a particular process 3974 executing under a second virtual machine, VM 7, is allocated PARTID 2, and the VM7 itself and another process 1473 running under it is allocated PARTID 0. It is not necessary to allocate a bespoke partition ID to every software execution environment. A default partition ID may be specified to be used for software execution environments for which no dedicate partition ID has been allocated. The control of which parts of the partition ID space are allocated to each software execution environment is carried out by software at a higher privilege level, for example a hypervisor running at EL2 controls the allocation of partitions to virtual machine operating systems running at EL1. However, in some cases the hypervisor may permit an operating system at a lower privilege level to set its own partition IDs for parts of its own code or for the applications running under it. Also, in some examples the secure world 90 may have a completely separate partition ID space from the normal world 92, controlled by the secure world OS or monitor program EL3.

Table 2 below summarises which partition ID register 100 is used for memory transactions executed in each operating state, and which operating states each partition ID register 100 are controlled from (that is, which operating state can update the information specified by that register):

TABLE 2

| Partition ID register 100 | Controlled From | Controls IDs When Executing In | Notes (explained in more detail below) |
|---|---|---|---|
| MPAM0_EL1 | NS_EL1 | NS_EL0 when PLK_EL0 in MPAM1_EL1 = 0 (Applications) | MPAM0_EL1 IDs can be remapped with virtualization option. Can be overridden by MPAM1_EL1 control bit, PLK_EL0. |
| MPAM1_EL1 | NS_EL2 NS_EL1 | NS_EL1 (Guest OS) NS_EL0 when PLK_EL0 = 1 | MPAM1_EL1 IDs can be remapped with virtualization option. Can override MPAM0_EL1. If NS_EL2 not implemented, MPAM1_EL1 is controlled by NS_EL1. If NS_EL2 is implemented, MPAM1_EL1 may be controlled from NS_EL2 if MPAM2_EL2.EL1_WRINH is 1, or from NS_EL2 and NS_EL1 if MPAM2_EL2.EL1_WRINH is 0. |
| MPAM2_EL2 | EL3 NS_EL2 | NS_EL2 (Hypervisor) | If EL3 is not implemented or MPAM secure option not implemented, MPAM2_EL2 is only controlled from NS_EL2. |
| MPAM1_EL1_S (optional - if not provided, MPAM1_EL1 can be used for controlling IDs in S_EL1 and S_EL0) | EL3 S_EL1 | S_EL1 S_EL0 (secure) | MPAM1_EL1_S may be controlled from EL3 if MPAM3_EL3.EL1_S_WRINH is 1, or from EL3 and S_EL1 if MPAM3_EL3.EL1_S_WRINH is 0. |
| MPAM3_EL3 | EL3 | EL3 | MPAM3_EL3 is controlled from EL3. |

Figure 6:
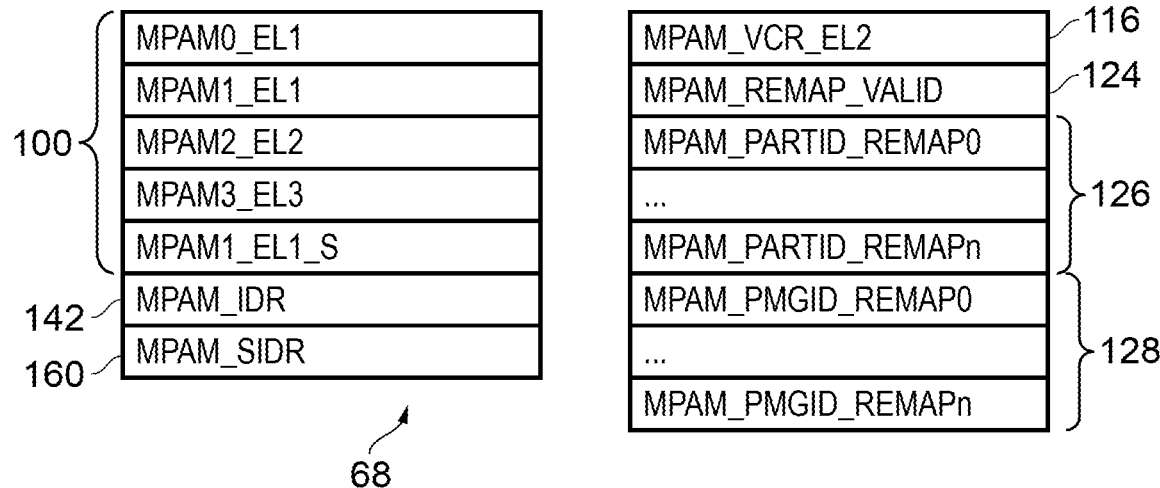
FIG. 6 shows an example of control registers for controlling which partition identifier is specified for a given memory transaction.

FIG. 6 shows an example of the MPAM control registers 68. The MPAM control registers 68 include a number of partition ID registers 100 (also known as MPAM system registers) each corresponding to a respective operating state of the processing circuitry. In this example the partition ID registers 100 include registers MPAM0_EL1 to MPAM3_EL3 corresponding the respective exception levels EL0 to EL3 in the non-secure domain 92, and an optional additional partition ID register MPAM1_EL1_S corresponding to exception level EL1 in the secure domain 90. In this example, there is no partition ID register provided for EL0 in the secure domain, as it is assumed that the trusted applications 98 in the secure domain are tied closely to the secure world operating system 96 that runs those applications 98 and so they can be identified with the same partition ID. However, in other implementations a separate partition ID register could be provided for EL0 in the secure world. Each partition ID register 100 comprises fields for up to three partition IDs as shown in table 1 below:

TABLE 1

| ID Name | Description |
|---|---|
| PARTID_D | Partition ID used for data requests. |
| PARTID_I | Partition ID used for instruction requests. |
| PMG | Performance monitoring group ID. |

The naming convention MPAMx_Ely for the partition ID registers indicates that the partition IDs specified in the partition ID register MPAMx_ELy are used for memory transactions issued by the processing circuitry 6 when in operating state ELx and that state ELy is the lowest exception level at which that partition ID register MPAMx_ELy can be accessed. However, when the current exception level is EL0 in the non-secure domain, MPAM0_EL1 can be overridden—when a configuration value PLK_EL0 set in MPAM-EL1 is set to 1 the partition IDs in MPAM1_EL1 are used when executing in NS_EL0. Hence, the control for EL1 can override the control for EL0 when desired. This can be useful for constraining all applications running under a particular virtual machine to use the same partition ID to avoid needing to update MPAM0_EL1 each time there is a context switch between applications within the same virtual machine. While the configuration parameter PLK_EL0 is described as being stored in MPAM1_EL1 in this example (the partition ID register corresponding to the higher exception level which sets that configuration parameter), it could also be stored in another control register.

In general, when switching between different processes executed at the same state (e.g. different applications at EL0 or different guest operating systems at EL1), an exception event triggers a switch to a higher exception state where the process running at that state (e.g. the operating system at EL1 or the hypervisor at EL2) then updates the partition IDs in the relevant partition ID register 100 before returning processing to the lower exception state to allow the new process to continue. Hence, the partition IDs associated with a given process may effectively be seen as part of the context information associated with that process, which is saved and restored as part of the architectural state of the processor when switching from or to that process.

However, by providing multiple partition ID registers 100 corresponding to the different operating states of the system, it is not necessary to update the contents of a single partition ID register each time there is a change in operating state at times other than at a context switch, such as when an operating system (OS) traps temporarily to the hypervisor for the hypervisor to carry out some action before returning to the same OS. Such traps to the hypervisor may be fairly common in a virtualised system, e.g. if the hypervisor has to step in to give the OS a different view of physical resources than what is actually provided in hardware. Hence, by providing multiple partition ID registers 100, labelling of memory system transactions with partition IDs automatically follows changes of the exception level or of the secure/non-secure state, so that there is faster performance as there is no need to update the partition IDs each time there is a change in exception level or security state.

Also, providing separate secure and less secure partition ID registers can be preferable for security reasons, by preventing a less secure process inferring information about the secure domain from the partition IDs used, for example. However, banking partition ID registers per security state is optional, and other embodiments may provide only a single version of a given partition ID register shared between the secure and less secure domains (e.g. MPAM1_EL1 can be used, with MPAM1_EL1_S being omitted). In this case, the monitor code executed at EL3 may context switch the information in the partition ID register when switching between the secure and less secure domains.

Also, in general the control information, such as the partition IDs and any associated configuration information, specified within the partition ID register 100 associated with a given operating state is set in response to instructions executing at a higher exception level than the exception level associated with that partition ID register 100. However, again this general premise can be overridden for some of the registers, where the higher exception level code may set a configuration parameter EL1_WRINH, EL2_WRINH or EL1_S_WRINH which controls whether code executing at a given operating state may set its own partition IDs in the corresponding partition ID register. That is, the WRINH configuration values specify whether a given execution environment is allowed to set the partition IDs allocated to itself. While the examples below show the WRINH flag for controlling setting of the partition IDs by a given exception level being stored in the partition ID register 100 associated with the next highest exception level, alongside the partition IDs for that exception level, it will be appreciated that these flags could also be stored in a separate control register.

More particularly, Table 3 lists the information included in each partition ID register 100, and Table 4 summarises which states each partition ID register 100 can be read or written from. Some of the registers 100 include information specific to that register as shown.

TABLE 3

| Which PARTID register 100? | Field Name | Description |
|---|---|---|
| all | PARTID_I | Partition ID for instruction accesses |
| all | PARTID_D | Partition ID for data accesses |
| all | PMG | Performance monitoring group ID |

TABLE 3-continued

| Which PARTID register 100? | Field Name | Description |
|---|---|---|
| MPAM1_EL1 | PLK_EL0 | PLK_EL0 locks the PARTID used at NS_EL0 to be the same as the PARTID used at NS_EL1. |
| MPAM1_EL1_S (optional - if not provided then PLK_EL0 in MPAM1_EL1 controls locking of the PARTID used at EL0 for both the S and NS states) | PLK_EL0 | PLK_EL0 locks the PARTID used at S_EL0 to be the same as the PARTID used at S_EL1. |
| MPAM2_EL2 | EL1_WRINH | If 1, writes to MPAM1_EL1 from NS_EL1 trap to NS_EL2. |
| MPAM3_EL3 | EL2_WRINH | If 1, writes to MPAM2_EL2 from NS_EL2 trap to EL3. |
| MPAM3_EL3 | EL1_S_WRINH (optional - provided if MPAM1_EL1_S is provided) | If 1, writes to MPAM1_EL1_S from S_EL1 are trapped to EL3. |

TABLE 4

| PARTID register 100 | EL0 | NS_EL1 | S_EL1 | EL2 | EL3 |
|---|---|---|---|---|---|
| MPAM0_EL1 | R | RW | RW | RW | RW |
| MPAM1_EL1 | — | R(W*) | — | RW | RW |
| MPAM2_EL2 | — | — | — | R(W*) | RW |
| MPAM3_EL3 | — | — | — | — | RW |
| MPAM1_EL1_S | — | — | R(W*) | — | RW |

Where the asterisks indicate that:
MPAM1_EL1 can be written from NS_EL1 when EL1_WRINH in MPAM2_EL2=0, but when EL1_WRINH=1 then writes to MPAM1_EL1 from NS_EL1 trap to EL2;
MPAM2_EL2 can be written from EL2 when EL2_WRINH in MPAM3_EL3=0, but when EL2_WRINH=0 then writes to MPAM2_EL2 from EL2 trap to EL3;
MPAM1_EL1_S can be written from S_EL1 when EL1_S_WRINH in MPAM3_EL3=0, but when EL1_S_WRINH=1 then writes to MPAM1_EL1_S from S_EL1 trap to EL3.

Hence, an attempt to set the partition ID register 100 from within the same exception state when not allowed by a higher exception state causes an exception event which triggers a switch to that higher exception state. An exception handler at the higher exception state can then decide how the partition ID should be set.

Note that in the alternative embodiment described above where MPAM_EL1_S is omitted, MPAM1_EL1 would be R(W*) accessible from both NS_EL1 and S_EL1 (with EL1_WRINH controlling whether write access is possible from EL1), and the EL1_S_WRINH configuration parameter can be omitted from register MPAM3_EL3.

In general, when a memory transaction is generated by the processing circuitry 6, one of the partition ID registers 100 is selected based on the current operating state as specified above. If the memory transaction is for accessing an instruction, the transaction is tagged with a partition ID derived from the PARTID_I field of the selected partition ID register. Page table walk memory transactions triggered by a miss in the TLB 72 for an instruction access would use the same partition ID as the instruction access. If the memory transaction is for accessing data, then the transaction is tagged with a partition ID derived from the PARTID_D field of the selected partition ID register 100 (and again any page table walk access triggered by the MMU following a data access would use the same partition ID as the data access itself). Note that regardless of whether the MMU issuing a page table walk access itself supports resource/performance monitoring partitioning based on the partition ID, it may still append the relevant PARTID_D or PARTID_I identifier to the corresponding memory transaction to allow memory system components in another part of the memory system to perform such partitioning. The PARTID_D and PARTID_I fields of a given partition ID register may be set to the same partition ID or to different partition IDs.

It can be useful to allow separate partition IDs to be defined for the data and instruction accesses for the same software execution environment, so that different resource control parameters can be used for the corresponding instruction and data accesses. An alternative approach would be to have a single partition ID associated with a software execution environment as a whole, but to append an additional bit of 0 or 1 depending on whether the access is for instructions or data, and this would allow the memory system component to select different control parameters for the instruction and data accesses respectively. However, for a given number of sets of control parameters selected based on the partition ID, this approach would mean that there would have to be a 50-50 split of the partition ID space between data and instructions. In practice, it may often be desirable to have more data partitions than instruction partitions, because it can be relatively common for multiple software execution environments to use the same code but execute with different data inputs, and so it can be particularly useful to be able to share a single instruction partition ID among multiple software execution environments while allowing each of those environments to use different data partitions. The approach of appending a 0 or 1 bit to indicate instruction on data accesses would in that circumstance require multiple sets of identical configuration information to be defined at the memory system component for each separate instance of the common code. In contrast, by providing separate instruction and data partition fields in the partition ID register 100, where the instruction and data partition IDs are selected from a common ID space, it is possible to reuse the same partition ID between different software execution environments and to partition the partition ID space between data and instructions as required without constraining this to a fifty-fifty split. Even though some additional storage capacity may be required for two partition ID fields in each partition ID register 100, this approach can save resource at the memory system component since by sharing one partition between the instruction accesses of multiple execution environments, fewer sets of control parameters (and hence less storage) are required at the memory system component.

Regardless of whether the transaction is for an instruction or data access, the transaction is also tagged with a performance monitoring partition ID derived from the PMG field of the selected partition ID register 100. This enables memory system components to partition performance monitoring, e.g. by using the performance monitoring ID of the memory transaction as part of the criteria for determining whether a given performance monitor should be updated in response to the memory transaction. In one embodiment, the PMG field may be treated as completely independent of the PARTID_D and PARTID_I fields. In this case, memory system components implementing performance monitoring may determine whether a memory transaction causes an update of a given performance monitor in dependence on the performance monitoring partition ID only, independent of the data/instruction partition ID included in the same memory transaction. This would provide the advantage that different partitions for instruction/data accesses could nevertheless share the same performance monitoring ID, which would support gathering of combined performance statistics for a number of processes which require different instruction/data access configurations at a memory system component. Hence, by specifying a performance monitoring group ID separate from the partition IDs used for controlling resource allocation at the memory system component, this allows multiple different software execution environments to be tracked using a common set of performance counters even if their resources are being allocated separately.

Alternatively, another approach may be to interpret the PMG field as a suffix to be appended to the corresponding partition ID derived from the PARTID_D or PARTID_I fields. With this approach, when a transaction is issued to memory, the transaction is appended with two IDs, one based on the selected PARTID_I or PARTID_D fields, and another based on the PMG field, but the PMG field is regarded as a property of the instruction/data partition ID rather than an ID in its own right. Hence, memory system components can in this case perform resource partitioning based on a first partition ID derived from PARTID_I or PARTID_D, but perform performance monitoring partitioning based on the combination of the first partition ID and a second partition ID derived from PMG. With this approach, it is no longer possible for different instruction/data partition IDs to share the same performance monitoring ID, but the advantage is that a shorter PMG field can be used to save hardware cost as the PMG field does not need to distinguish all possible performance monitoring partitions—only the partitions that share the same instruction/data partition ID are distinguished by the PMG field. For example this can allow a 1 or 2-bit PMG field to be used rather than a larger field, which saves cost not only in the control registers 68 but also in the wires which carry the memory transactions through the memory system. In some embodiments, separate PMG suffix fields PMG_D and PMG_I could be provided corresponding to the PARTID_D and PARTID_I fields respectively, to allow separate performance monitoring group properties to be defined for data and instruction accesses respectively.

Either way, the ability to define multiple performance monitoring partitions per data/instruction partition ID can be useful. On the other hand, it will be appreciated that other examples could omit the separate performance monitoring ID field altogether, and instead use the same partition ID to control both the management of resources and the performance monitoring.

Figure 7:
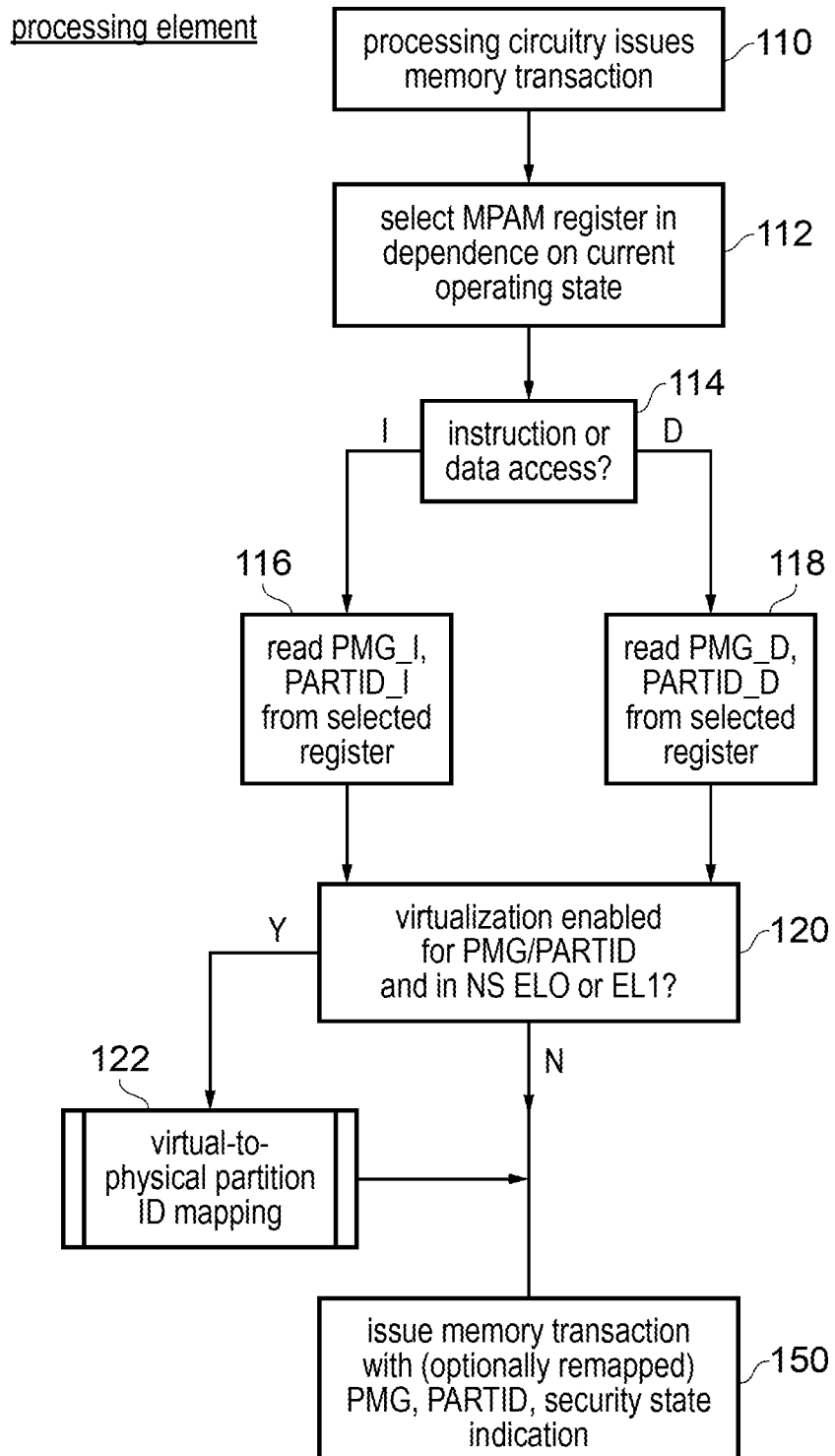
FIG. 7 is a flow diagram illustrating a method of issuing a memory transaction from a master device.

FIG. 7 is a flow diagram illustrating a method of controlling issuing of a memory transaction from a processing element such as a CPU 6, GPU or other master acting as a source of memory transactions, in particular controlling which partition ID is specified with the memory transaction. At step 110 the processing element determines that a memory transaction needs to be issued. For example this may be because a load/store instruction is executed at the execute stage 48, or caused by an instruction prefetch operation for prefetching instruction into the instruction cache.

Figure 8:
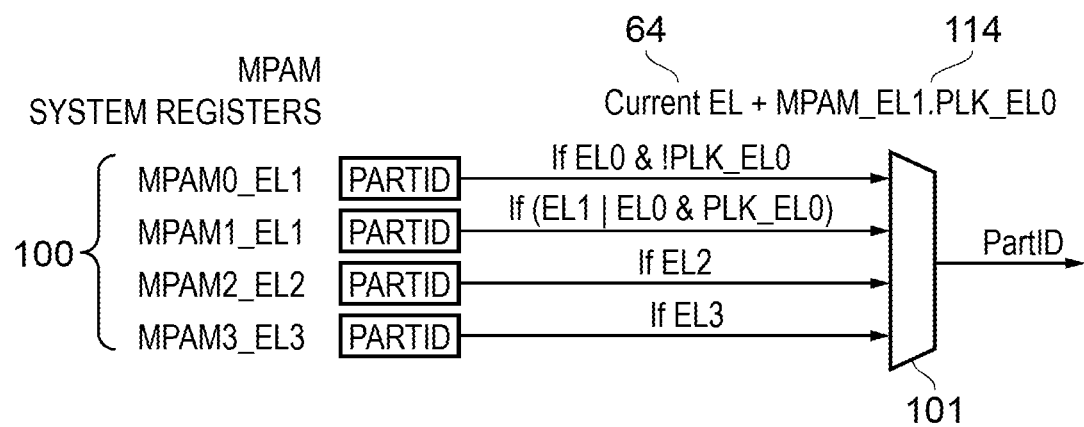
FIG. 8 schematically illustrates selection of a partition identifier register in dependence on a current operating state of the processing circuitry.

At step 112 the processing element selects one of the partition ID registers 100 in dependence on its current operating state. FIG. 8 schematically illustrates an example of selecting which one of the partition ID registers 100 should be used to generate the partition ID for the current memory transaction, in dependence on at least the current exception level 64 and the configuration parameter 114 PLK_EL0 stored in partition ID register MPAM1_EL1. The criteria for selecting which register 100 is the selected register are as follows:
- If the current exception level is EL0, and PLK_EL0=0, then MPAM0_EL1 is the selected register;
- If either (i) the current exception level is EL1 or (ii) the current exception is EL0 and PLK_EL0=1, then MPAM1_EL1 is the selected register;
- If the current exception state is EL2 then the selected register is MPAM2_EL2;
- If the current exception state is EL3 then the selected register is MPAM3_EL3.

The provision of a PLK_EL0 configuration parameter is optional, and in systems which do not support this feature, MPAM0_EL1 is selected when the current exception level is EL0 in the non-secure state, not MPAM1_EL1.

Also, in an embodiment as mentioned above which has a separate secure partition ID register MPAM1_EL1_S, the selection would also depend on the current security state, with register MPAM1_EL1_S being selected when processing at EL0 or EL1 in the secure domain, and otherwise the selection would be as listed above.

At step 114 the processing element determines whether the memory access is an instruction access or a data access. If the access is an instruction access, then at step 116 the PMG and PARTID_I fields of the register selected at step 112 are read, while if the access is a data access then at step 118 the PMG and PARTID_D fields are read. Hence, the partition ID used for resource partitioning depends on whether the access is for data or an instruction (although in some cases both may nevertheless specify the same partition ID).

At step 120, the processing element determines whether virtualization is enabled for the read partition IDs (PMG and either PARTID_I or PARTID_D) in the current operating state. The MPAM control registers 68 include a virtualisation control register 116 (MPAM_VCR_EL2), a remap valid register 124, partition ID remapping registers 126 for remapping partition IDs for performance resource partitioning, and performance monitoring ID remapping registers 128 for remapping partition IDs for performance monitoring partitioning. The virtualisation control register 116 includes virtualisation enable flags specifying whether virtualisation is enabled for EL1 and EL0. If virtualisation is enabled for EL0 and the operating state is EL0, or if virtualisation is enabled for EL1 and the operating state is EL1, then at step 122 at least one of the partition IDs read at step 116 or 118 is mapped to a physical partition ID appended to the memory transaction to be issued to the memory system. Otherwise step 122 is omitted.

Figure 9:
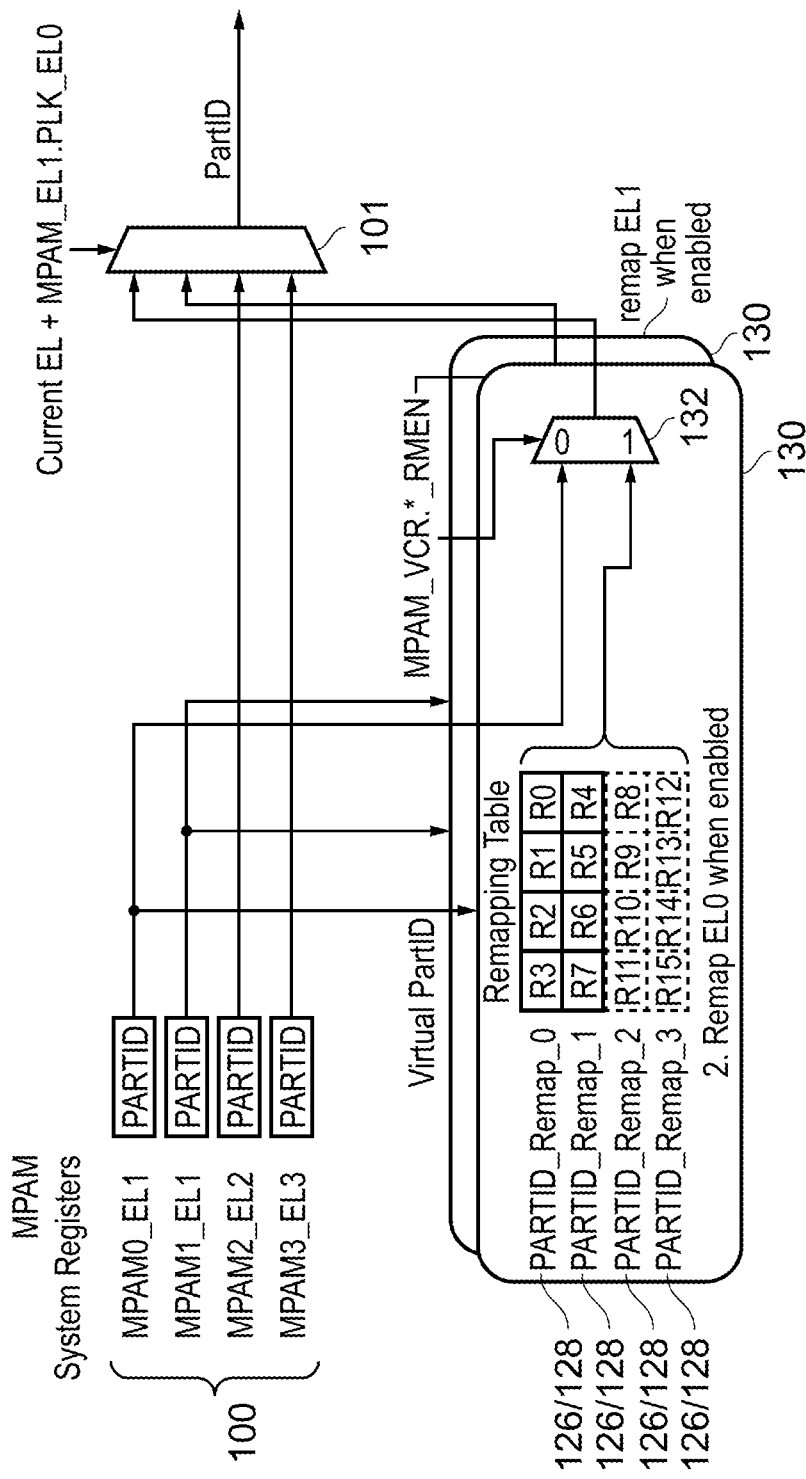
FIG. 9 schematically illustrates an example of remapping virtual partition identifiers to physical partition identifiers.

An example of virtualised remapping of partition IDs is illustrated in FIG. 9. The global partition ID space may be controlled by the hypervisor at EL2, with separate ID spaces for the resource partition IDs and the performance monitoring group IDs. Virtualisation can be applied for both types of partition ID—for conciseness the subsequent explanation will use the term "partition identifier" to refer to either type. However, some embodiments could only support virtualisation for resource partition IDs, but may not support remapping of performance monitoring groups, for example.

The hypervisor may restrict a guest operating system executing at EL1 to use only a small range of partition IDs (e.g. starting from zero) and the remapping registers 126, 128 define a remapping table which provides a number of remapping entries for mapping the virtual partition IDs used by that guest operating system to physical partition IDs within the global ID space. Each remapping register may store remapping entries for one or more virtual IDs (depending on the relative size of the register compared to the width of a single partition ID). The remapping table is indexed based on the virtual partition ID used by the operating system and returns a corresponding physical partition ID in the global ID space. This enables each guest operating system to set IDs for its own applications unaware of the fact that it is virtualised and executing alongside other guest operating systems which may be using similar ID values. The respective guest operating systems may have their conflicting virtual IDs mapped to different global physical partition IDs by the mapping set up in the remapping table by the hypervisor.

Hence, FIG. 9 shows how the selection circuitry of FIG. 8 can be extended to support virtualisation. A multiplexer 101 selects between the partition ID registers 100 in the same way as shown in FIG. 8. The partition IDs from registers MPAM2_EL2 and MPAM3_EL3 are provided directly to the multiplexer 101 directly in the same way as in FIG. 8. However, the IDs from registers MPAM0_EL1 and MPAM1_EL1 are passed via remapping circuitry 130. The virtual partition ID specified in MPAM0_EL1 or MPAM1_EL1 is used to select a corresponding remapping entry from the remapping registers 128. In this example each remapping register 128 includes four remapping entries, so two bits of the virtual partition ID select the particular remapping entry within a remapping register 128 and the remaining bits select which remapping register 128 is selected. However, other examples may have different numbers of entries per register. The physical partition ID is read from the selected remapping entry and provided to multiplexer 132, which selects between the original virtual partition ID read from MPAM0_EL1 or MPAM1_EL1 and the corresponding remapped physical partition ID, in dependence on configuration parameter EL0_RMEN or EL1_RMEN in the virtualisation control register 116 which specifies whether virtualisation is enabled for EL0 or EL1 respectively. When virtualisation is not enabled, the original virtual partition ID is passed to multiplexer 101, while when virtualisation is enabled the physical partition ID is used. While FIG. 9 shows separate remapping circuitry 130 provided for EL0 and EL1, in other cases a common remapping circuit could be used.

Each remapping entry is associated with a corresponding valid bit in the remap valid register 124. The valid bit for a given remapping entry specifies whether that virtual-to-physical partition ID mapping is valid. When a processing element issues a memory transaction specifying an invalid virtual partition ID, this may trigger an exception condition which causes a switch to a higher exception state (EL2), so that the hypervisor can update the remapping entry to define the physical partition ID to be used for that virtual partition ID. Alternatively, the trap to the higher exception state could be triggered when the operating system at EL1 attempts to set one of the partition ID registers MPAM0_EL1, MPAM1_EL1 to a virtual ID corresponding to an invalid remapping entry, instead of at the time of issuing a memory transaction. Either way, by providing valid bits for signalling which remapping entries are valid, this enables the hypervisor to allocate virtual-to-physical partition ID mappings in a lazy fashion so that it is not necessary to define all the mappings for a given operating system at once. Instead, the hypervisor can wait until the operating system actually attempts to use a given virtual partition ID before defining the corresponding ID mapping. As often an operating system may not use all the virtual partition IDs that are theoretically available, such lazy allocation can improve performance when context switching to a given operating system, by avoiding spending time setting the remapping registers for virtual IDs which are never used.

Another approach for handling requests specifying an invalid virtual partition ID may be for the remapping circuitry to remap the invalid virtual partition ID to a certain predetermined physical partition ID. Hence, instead of handling invalid virtual partition IDs using an exception mechanism, the remapping circuitry simply uses an "in case of error" value for the physical partition ID, which is passed to the memory system component along with the corresponding memory request and treated as a valid partition ID. The predetermined physical partition ID could be a certain "default" value of the partition ID, e.g. the same default partition ID used for software execution environments which do not have a bespoke partition ID allocated to them. For example the predetermined physical partition ID could be zero. Alternatively, a control register (PARTID_ON_ERROR) may define the particular value of the physical partition ID to be used as the predetermined physical partition ID in case of error.

While FIG. 6 shows an example where the valid bits are stored in a separate register 124 from the remapping registers 126, 128, in other implementations each remapping entry could itself include a valid bit, so that the valid bits are stored alongside the corresponding physical partition IDs in the remapping registers 126, 128. In this case, the remap valid register 124 can be omitted. Hence, in general each remapping entry may be associated with a valid bit, but the location in which the valid bit is stored may vary depending on the implementation choice.

The virtualisation control register 116 may include separate enable parameters for exception level EL0 and exception level EL1 respectively, each defining whether remapping of partition ID registers is enabled for memory transactions issued in the corresponding exception state. Similarly, separate enable parameters may be provided for controlling whether to remap partition IDs for resource partitioning and performance monitoring group IDs for performing monitoring partitioning respectively. Hence, in some cases the virtualisation control register 116 may specify:

EL0_PARTID_RMEN: Enable remapping of PARTID in MPAM0_EL1
EL1_PARTID_RMEN: Enable the remapping of PARTID in MPAM1_EL1.

Optionally, virtualised remapping of performance monitoring IDs in the PMG field could also be supported, in which case further virtualisation control parameters EL0_PMG_RMEN and EL1_PMG_RMEN could be specified for enabling the remapping of performance monitoring IDs at EL0 and EL1 respectively. However, in embodiments where the PMG field is treated as a sub-property of the PARTID, additional control for enabling remapping of performance monitoring IDs may not be necessary.

Hence, it will be appreciated that while FIG. 7 for conciseness shows a single decision step 120 for determining whether to remap IDs at step 122, in practice a separate decision may be made for the different IDs appended to the same memory transaction—e.g. the performance monitoring ID (PMG) may be remapped while the resource partitioning ID (PARTID) is not, or vice versa. Also, while FIG. 7 for ease of understanding shows a sequential process with step 122 as a conditional step, in practice as shown in FIG. 9 the physical partition ID could be calculated for each memory transaction, and both the remapped and non-remapped versions of the partition ID may be provided to a multiplexer 132 which selects between them based on the relevant enable parameter. This can be faster than waiting until it has been determined whether virtualisation is enabled before looking up the physical partition ID.

One skilled in the art can appreciate that cascaded multiplexors as shown in FIG. 9 might be connected in different ways to achieve the same effect, including combining into a single multiplexor with more inputs.

Figure 10:
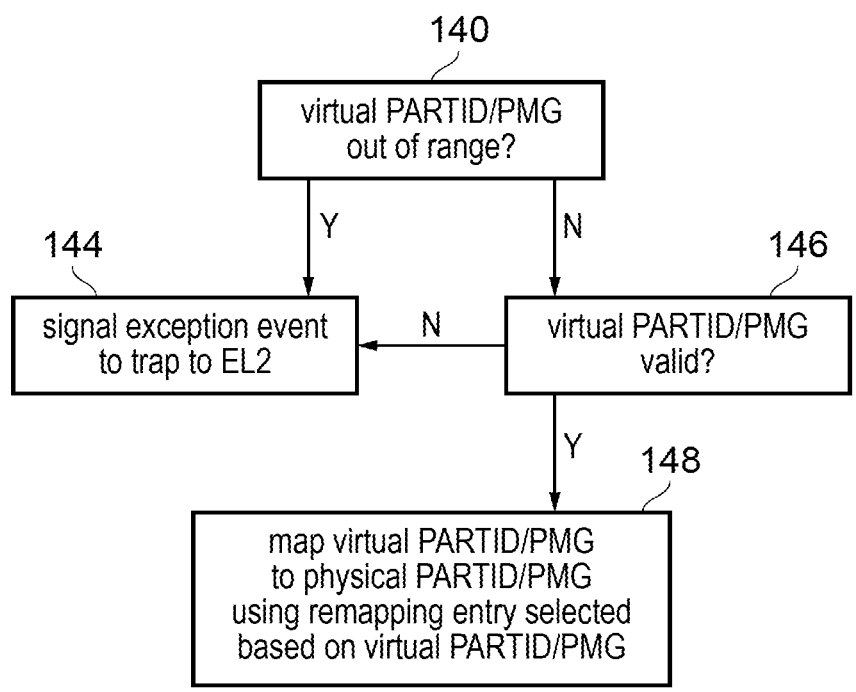
FIG. 10 is a flow diagram illustrating a method of mapping a virtual partition identifier to a physical partition identifier.

FIG. 10 is a flow diagram illustrating step 122 in more detail. At step 140 it is determined whether the partition ID being remapped is out of range. For example, the virtualisation control register 116 or another of the MPAM control registers 68 (e.g. a discovery register 142 for identifying to software what capabilities are provided in hardware, which is discussed in more detail below) may specify the maximum ID value permitted to be specified by the current context. For example the hypervisor may define the remappable range of partition IDs which can be used by the operating system executing under it, for example based on how many remapping registers 128 are provided in hardware. If the partition ID being remapped (i.e. the ID read from the register selected at step 112 of FIG. 7) is out of range, then at step 144 an exception event is signalled to cause a trap to a higher exception level. Typically the higher exception level would be EL2, so that an exception handler in the hypervisor can take action for dealing with the inappropriate partition ID. For example, the hypervisor could signal that an error has occurred, or remap the out of range partition ID to another partition ID in the global partition ID space which the operating system is allowed to use (e.g. the default partition ID used for processes which have not had a particular ID allocated to them).

If the virtual partition ID is within the permitted range, then at step 146 it is determined whether the corresponding remapping entry is valid, e.g. based on the corresponding valid bit in the remap valid register 124. If the current ID is not valid, then again at step 144 an exception event is signalled to trap to EL2, so that an exception handler associated with the hypervisor can handle the invalid partition ID. For example the hypervisor may respond by allocating a physical partition ID to that virtual partition ID and updating the corresponding valid bit to indicate that this mapping is now valid, before returning execution to EL1 to allow the operating system to continue with the newly allocated mapping.

On the other hand, when the virtual ID is within the allowed range and is valid, then at step 148 the virtual ID is mapped to a physical ID specified in the remapping entry corresponding to the virtual ID.

Figure 11:
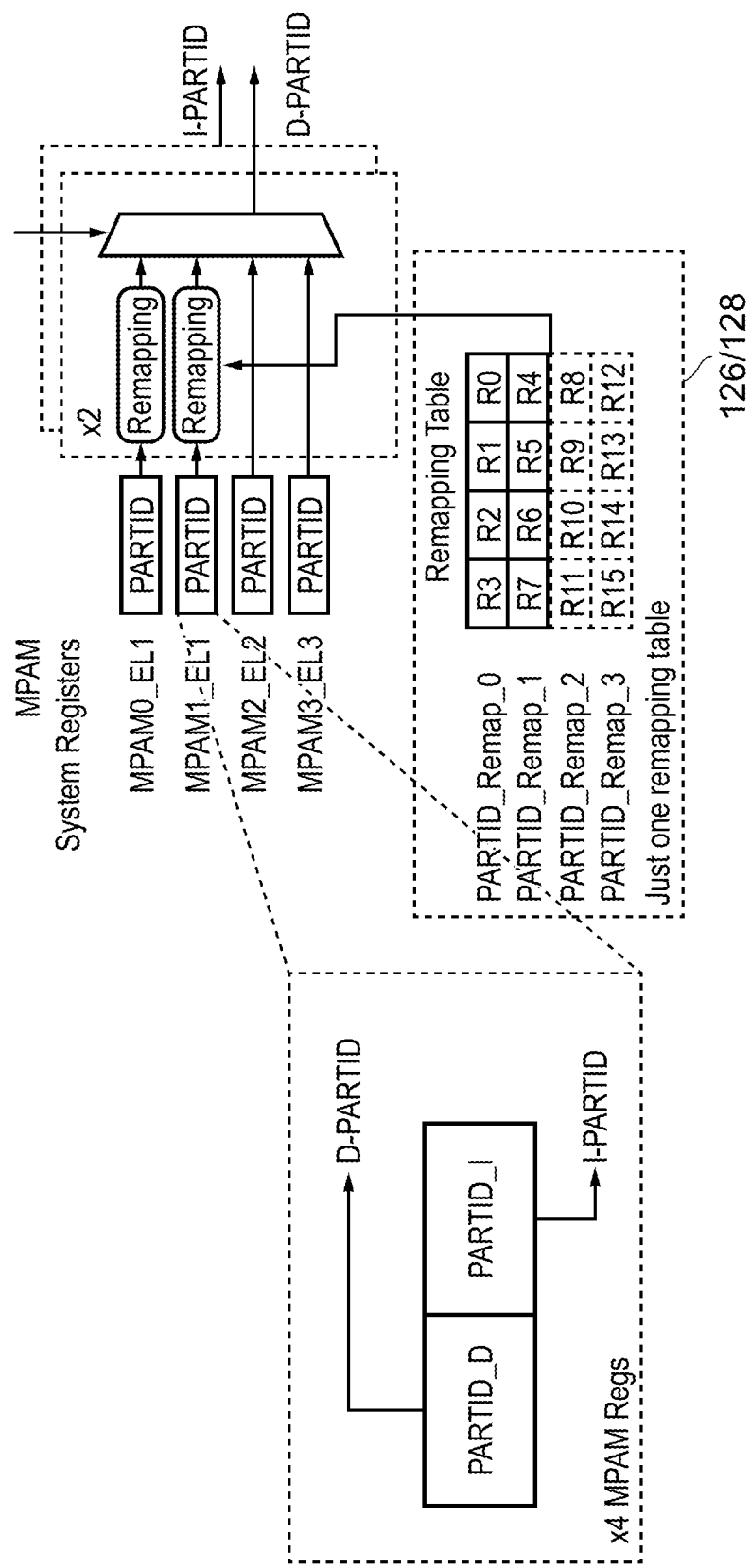
FIG. 11 schematically illustrates an example of generating separate partition identifiers for instruction and data memory transactions.

As shown in FIG. 11, while PARTID_I and PARTID_D are specified separately in the partition ID register 100, the remapping circuitry 130 may use a common remapping table 126, 128 for both types of ID. Hence, it is not necessary to provide separate sets of remapping registers 126, 128 for instruction and data accesses.

In summary, by providing remapping hardware (remapping registers 126, 128 and remapping circuitry 130) for remapping a smaller space of virtual IDs onto physical IDs in the global ID space used by the memory system components, this allows multiple guest operating systems to coexist while using conflicting partition IDs, while improving performance as there is no need for each memory transaction to trap to the hypervisor for remapping the partition IDs.

At step 150 of FIG. 7, the memory transaction is issued specifying the PMG and PARTID (either in the original form read from the selected partition ID register, or following remapping at step 122), as well as a secure state indication indicating whether the security state in which the transaction was issued. The secure state indication is included so that the partition IDs allocated in the secure domain may use a completely separate partition ID space from the partition IDs allocated for the less secure domain (rather than allocating some partition IDs from a single ID space to the secure processes, which could allow non-secure processes to infer information about the secure processes that are provided). By providing complete separation between the secure and less secure worlds, security can be improved. The security indication provided with the transaction indicates which security state the transaction is issued from. Note that the security state indication may be provided with the transaction even in an embodiment where there is no MPAM_EL1_S register, as such embodiments may still support separate partition IDs for secure/non-secure states (with context switching of the partition IDs on security state transitions being the mechanism for enforcing the different IDs for each state, rather than the provision of a separate partition ID register).

This security indication may be provided separately from any address-based security indication indicating whether the target address of the transaction is secure or non-secure. That is, regions of the memory address space may be designated as secure or non-secure, with the secure regions being accessible only from the secure domain while the non-secure regions are accessible in both the secure and non-secure domains. Such an address-based security indication may be included with transactions in case the memory system includes further control structures, such as a system MMU, which control access in dependence on whether the address is in a secure or non-secure region. However, since the secure domain can access both non-secure and secure regions of the address space, this address-based security indication is not enough to identify whether the process which issued the transaction was secure or non-secure. Therefore, the memory transactions may separately identify both the domain from which the transaction is issued (MPAM_NS) and the security state associated with the target address (NS):

| MPAM_NS | NS | Meaning |
|---|---|---|
| 0 | 0 | Secure: a secure partition ID (access from secure state) used with access to a secure location. |
| 0 | 1 | Cross-state: a secure partition ID (access from secure state) used with access to a non-secure location. |
| 1 | 0 | Illegal as accesses from the non-secure state are not allowed to access a secure location. |
| 1 | 1 | Non-secure: a non-secure partition ID (access from non-secure state) used with access to a non-secure location. |

On receiving a memory transaction, the memory system component can then use the MPAM_NS security indication to select between different sets of parameters for the secure and non-secure domains respectively, to avoid sharing control parameters across domains, which could pose security risks if non-secure code could set performance control parameters or access performance monitoring data for secure code.

Returning to FIG. 6, the discovery register 142 identifies various capability parameters which identify hardware capabilities of the corresponding processing element (PE). This allows software to query what MPAM resources are provided in a given hardware implementation, so that the same code can be executed across multiple different hardware platforms. For example, the discovery register 142 may specify whether certain MPAM features (e.g. virtualisation, or separate secure/non-secure ID spaces) are provided at all, or what size of resource is provided (e.g. the number of bits in the partition IDs, or the number of mapping registers 126, 128). For example, the discovery register 142 may specify:

PARTID_MAX: the maximum partition ID supported by the hardware implementation for the PE;

HAS_VCR: whether the virtualization functionality is provided (and hence whether the virtualization control registers 116, remap valid register 124, remapping registers 126, 128 and remapping circuitry 130 is provided)

PARTID_REMAP_MAX: the maximum virtual partition ID supported by the hardware implementation for the PE;

PMG_MAX: the maximum PMG value supported by the hardware implementation for the PE;

PMG_REMAP_MAX: (optional)—in embodiments that support remapping of the PMG field, the maximum virtual performance monitoring partition ID supported by the hardware implementation for the PE;

HAS_MPAMF: indicates the presence in the PE of MPAM partitioning control facilities. For example, this can be set if the PE has an internal cache, TLB or other internal memory system component that has MPAM partitioning control facilities. PEs which can append partition IDs to memory transactions for use by other memory system components, but do not themselves have any partitioning control facilities which make use of the partition IDs to partition memory resources or performance monitoring resources, would have HAS_MPAMF cleared.

HAS_S: specifying whether the secure state is supported.

When the secure state is supported, a further secure discovery register MPAM_SIDR 160 may be provided to identify further capabilities of MPAM for the secure state:

S_PARTID_MAX: Maximum value of PARTID in the secure state

S_PMG_MAX: Maximum value of PMG in the secure state.

The discovery register 142 may be readable from any exception state other than EL0, but is read only—the discovery register 142 cannot be written to since it defines parameters which are inherent to the particular hardware implementation. For example the discovery register 142 may be hardwired during manufacture of the device. The secure discovery register 160 may be read from EL3 but inaccessible to other operating states.

When virtualisation is supported, it may be desirable to prevent the operating system at EL1 from reading the discovery register 142 directly, since the actual values of PARTID_MAX and PMG_MAX may be larger than the range of partition IDs which the hypervisor has permitted the operating system to use. Therefore, instructions executed at EL1 which attempt to access the discovery register 142 (or at least attempt to access the PARTID_MAX or PMG_MAX fields which define the maximum partition ID and performance monitoring group allowed to be specified for memory transactions) may trigger an exception, which traps to the hypervisor which can then provide a different value (e.g. PARTID_REMAP_MAX or PMG_REMAP_MAX) in place of the maximum value to emulate the number of partition IDs that are visible to the operating system. Alternatively, when the partition ID is out of bounds, instead of triggering an exception, this could be handled by mapping the partition ID to a predetermined "in case of error" value such as ID=0, in a similar way to handling of invalid virtual partition IDs as discussed above.

Hence, the virtualisation control register 116 defines a configuration parameter TRAP_MPAM_IDR_EL1 which controls whether such accesses to the discovery register 142 from EL1 are trapped to EL2. By setting this configuration parameter, the hypervisor at EL2 or secure monitor at EL3 can control whether the guest OS at EL1 can access the discovery register (IDR) 142 directly or whether the hypervisor must step in. Providing the flexibility to select whether IDR accesses trap to EL2 is useful to improve performance in cases when it is appropriate for the OS to access the IDR directly by avoiding unnecessary traps to EL2—e.g. when virtualisation is disabled.

While virtualisation is discussed above in the context of EL2 setting virtual to physical ID mappings for use by EL1 or EL0, in general this technique could be used for any pair of software execution environments of different privilege levels so that the higher privilege level environment can control remapping of virtual partition IDs to physical partition IDs for transactions issued by the lower privilege software execution environment. Also, unless otherwise specified, the techniques discussed above for partition IDs can also be used for performance monitoring groups in some embodiments, although this is not essential. Hence the term partition identifier can be interpreted as encompassing a performance monitoring group identifier unless otherwise specified.

The partition ID and performance monitoring group appended to a given memory transaction, as well as the security state indication specifying the security state from which the transaction was issued, flow with the memory transaction throughout the memory system. Hence, nodes of the memory system (e.g. an interconnect) which pass memory transactions on to other components of the memory system provide the outgoing memory transactions with the same partition ID, performance monitoring group and security state indication as the corresponding request received at such nodes. For caches within the memory system, these have the behaviour of sometimes generating a response to the request if there is a cache hit, and other times passing it on to a further part of the memory system if there is a cache miss. They may also sometimes allocate new entries based on the request. When allocating new entries, the cache may store the partition ID, performance monitoring group and security indication of request which caused the allocation, alongside the cached data itself. When data is written back to a further cache or memory, the write back transaction is generated specifying the partition ID, performance monitoring group and security indication associated with the evicted data in the cache, rather than the IDs associated with the request which triggered the eviction. This allows resource allocation or performance monitoring for writebacks to be controlled/monitored according to the parameters specific to the software execution environment which allocated the corresponding data to the cache.

Note that not all of the memory system components (caches, interconnects, memory controllers, memory devices, or memory management units for example) may support partitioning. Components which do not support partitioning may control resource allocation or monitor performance in a common manner for all software execution environments. Nevertheless, outgoing requests are still appended with partition IDs in the same way as discussed above so that downstream memory system components which do support partitioning can use the partition IDs to select the appropriate set of parameters. Hence, regardless of whether the system designer actually chooses to use the partition IDs at any given memory system component, the processing element architecture and partition ID routing scheme discussed above provides the flexibility to support a range of implementations which implement partitioning at different points of the memory system. However, for such memory system components which do respond to the partition ID or the performance monitoring group ID, these can control resource allocation or contention management, or performance monitoring, based on the partition ID.

Performance monitors work differently from the resource partitioning controls. Performance monitors measure, count or calculate performance metrics based on filters programmed into the monitor. The filter parameters may include partition ID and performance monitoring group (or performance monitoring group but not partition ID). For example, a performance monitor that counts bytes transferred to memory might filter the measurements to only count reads with partition ID of 5 and performance monitoring group of 2. Hence, performance measurements can be collected for different software execution environments, or different groups of software execution environments, that share the same partition ID and performance monitoring group.

On the other hand, for system components which support resource partitioning, the memory system component selects a set of memory system component parameters based on the partition ID. The memory system component parameters may be resource control parameters which are used to control allocation of memory system resources (such as bandwidth, cache capacity, etc.) or contention for those resources (e.g. the selected memory system component parameters may define the priority set for transactions associated with the corresponding partition ID).

Figure 12:
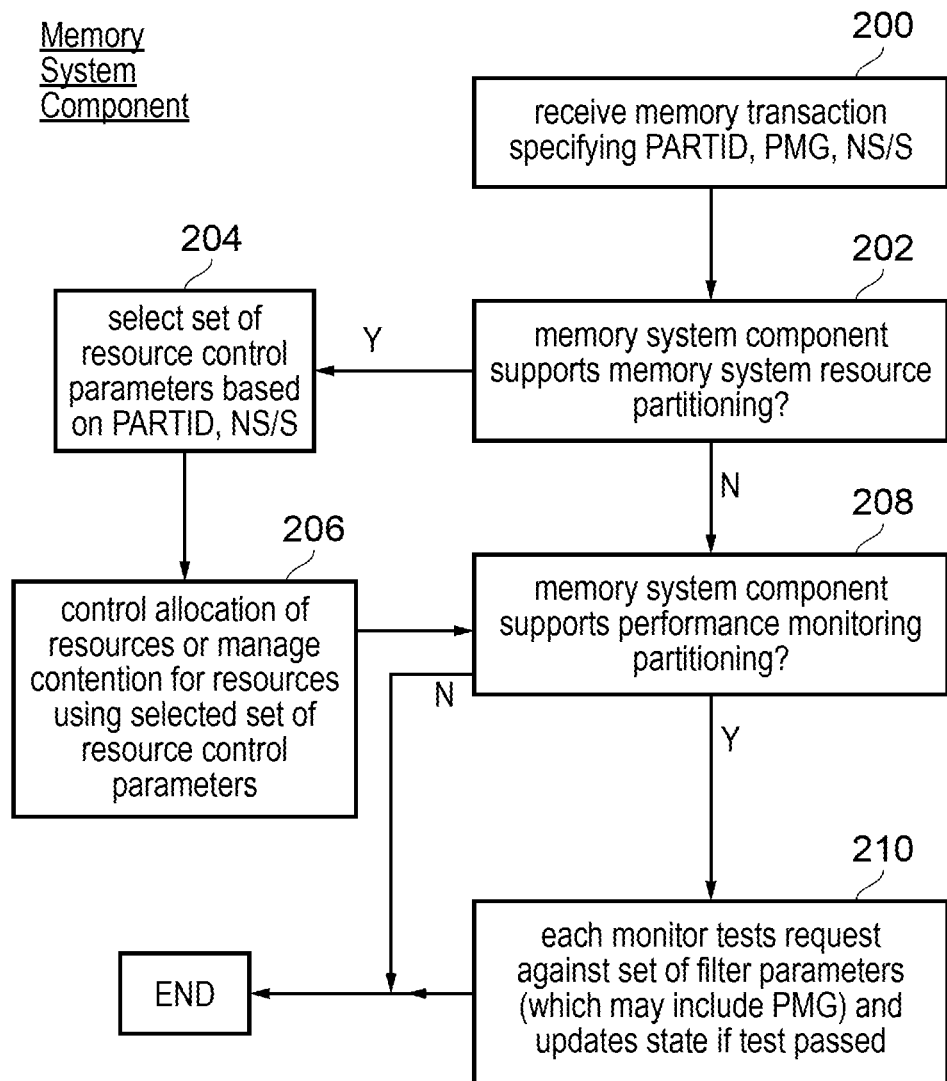
FIG. 12 is a flow diagram illustrating a method of responding to a memory transaction at a memory system component.

FIG. 12 shows a method for controlling the operation of the memory system component based on the partition ID. At step 200 the memory system component receives a memory transaction which specifies a partition ID, performance monitoring group and a security state indication as discussed above. If the memory system component supports memory system resource partitioning (step 202), then at step 204 a set of resource control parameters is selected base on the partition ID and the security state. The performance monitoring group is not considered at this step. At step 206, allocation of resources is controlled using the selected set of resource control parameters, or contention for those resources is managed using the selected set of resource parameters. If memory system resource partitioning is not supported then steps 204 and 206 are omitted.

If the memory system component supports performance monitoring partitioning by performance monitoring group (step 208) then at step 210 each of the performance monitors implemented in the component tests the request against its filter parameters (which may include tests to be applied to the PMG field and partition ID field). Each monitor that has its filter parameters met updates its internal state according the measurement, count or calculation that monitor is designed to make. Step 210 is omitted for memory system components which do not support performance monitoring partitioning. As explained above, in some embodiments both the partition ID field and PMG field may be included in the filter parameters (so that the PMG field further limits the partition ID field). Alternatively, PMG could be interpreted as an independent ID separate from the partition ID field, in which case the filter parameters may consider PMG but not partition ID.

Each memory system component which supports resource monitoring partitioning may have a set of parameter registers which store different sets of memory system component parameters, which are selected based on the partition ID. The control parameters for a partitioning control are logically an array of control parameters indexed by partition ID. The interface for setting control parameters could be arranged as an array of memory mapped registers, or could be arranged with a selector register and only a single configuration register per control parameter. In this latter case, the configuration software first stores a partition ID to configure into the selector register and then stores the desired control parameters in to the one or more control parameter configuration registers.

Figure 13:
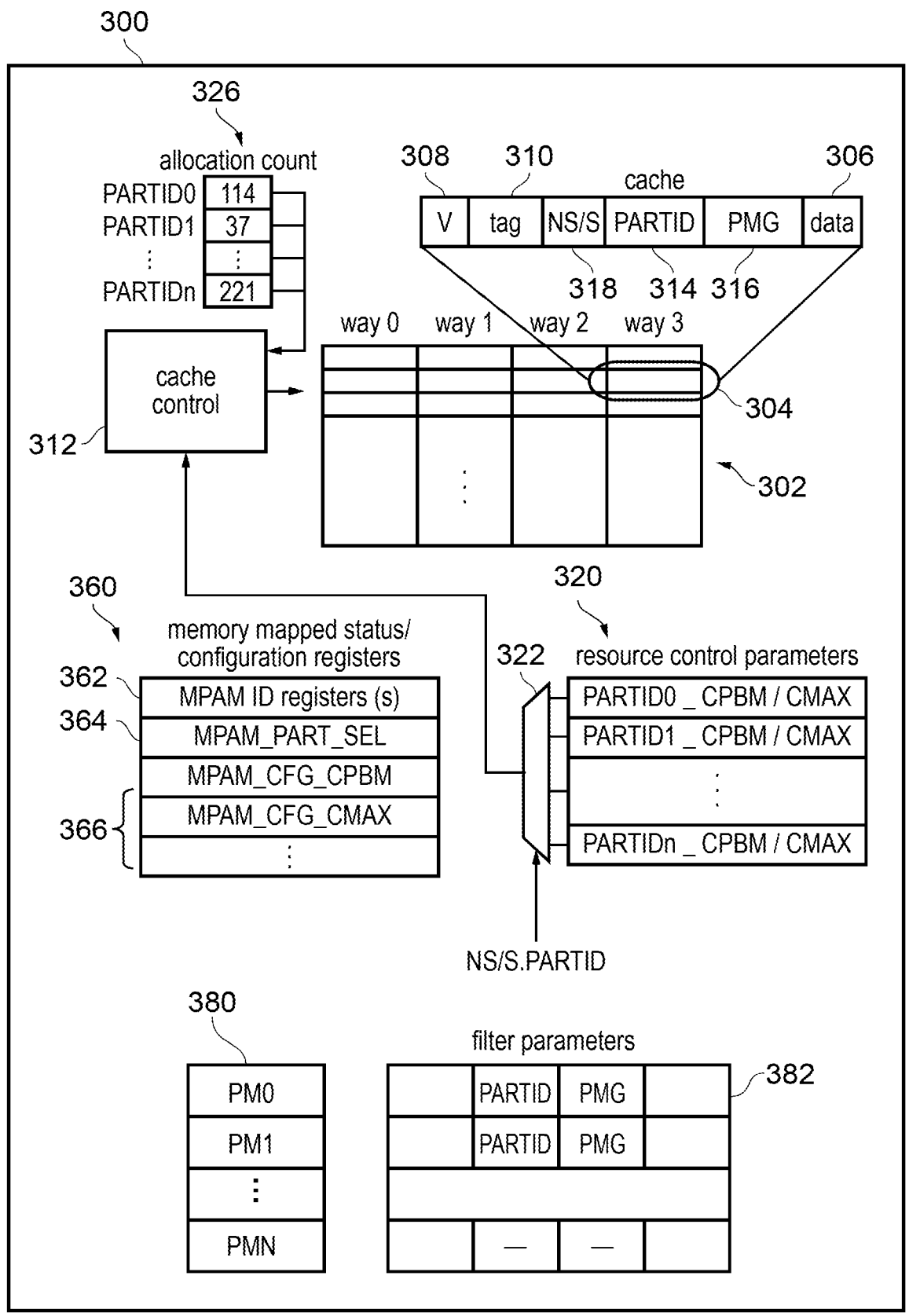
FIG. 13 shows an example of a cache which controls allocation of cache resource in dependence on the partition identifier and/or updates performance monitoring data selected based on a partition identifier.

FIG. 13 shows an example of a cache 300, which is one example of a memory system component. The cache 300 could be a cache for caching instructions or data, such as the level 1 data cache 8, level 1 instruction cache 10 or level 2 cache 12 of a given processing element 6, the cluster cache 16, or system cache 20. The cache 300 could also be a cache for address translation, such as the TLB 72 or page walk cache 74 in the MMU 70. While FIG. 3 shows an example where the MMU 70 is provided within a given processor core, it is also possible to provide system MMUs further down in the memory system, e.g. within the SoC interconnect 18.

The cache 300 has cache storage (cache RAM) 302 for storing the information to be cached. The cache RAM 302 has a certain number of storage entries 304. As shown in FIG. 13, each entry may store:
  the cached data 306 (which may be any cached information—encompassing not just data values but also instructions or address translation data depending on the type of cache),
  a valid bit 308 specifying whether the corresponding data in the entry is valid,
  a tag field 310 indicating a portion of the address associated with the cached data
  the partition ID 314 of the memory transaction that allocated the data into the cache
  the performance monitoring group ID 316 of the allocating memory transaction
  the security state indication 318 of the allocating memory transaction (which indicates which security state that memory transaction was issued from);
  other information that the system design may need to keep for each cache line, for example coherence state or address space indicator (ASI).

On evictions of data from the cache, the ID fields 314, 316, 318 are used to derive the partition ID, performance monitoring group ID and security state indication for the write back transaction. Although not illustrated in FIG. 13, each cache entry may also store coherency information specifying a coherency state of the cached data (e.g. whether the data is clean or dirty for determining whether a writeback is required), and/or victim selection data for selecting a victim cache line when an eviction is required (e.g. data for tracking which entries were least recently used).

Allocation of data to the cache may be controlled in accordance with any known cache organization, including direct-mapped, set-associative or fully associative. The example in FIG. 13 shows a set-associative organization scheme with 4 ways, but it will be appreciated this is just one example. Lookups to the cache are performed independently of the partition ID associated with the corresponding memory transaction. Hence, when a memory transaction specifying a given partition ID is received, the transaction can hit against any data within the indexed cache entries, without regard to the partition ID 314, non-secure ID indicator 318 and performance monitoring group 316 stored in cache entries. Therefore, the partitioning of performance resources and/or performance monitoring does not prevent different software processes sharing access to cached data.

On the other hand, when allocating data to the cache, a cache controller 312 controls allocation in dependence on a set of resource control parameters which is selected based on the security state and the partition ID of the corresponding memory transaction. The cache has a set of resource control parameter registers 320 as mentioned above, each register 320 storing the resource control parameters for a corresponding software execution environment. A selector 322 selects one of the registers based on the partition ID and the security state of the incoming memory transaction which requires allocation of data to the cache. The parameters stored in the selected register are used to control whether, and how, data is allocated to the cache.

In a first cache partitioning control mode, allocation is controlled using a maximum capacity threshold selected using the partition ID, which identifies a maximum number of entries of the cache capacity which are allowed to be allocated with data associated with the corresponding partition ID. In implementations supporting secure and non-secure states, the threshold may define a maximum capacity allowed to be allocated with data associated with a given combination of partition ID and non-secure ID indicator. For example, the maximum capacity threshold could be set by a higher privilege process, i.e. the threshold for a given operating system can be set by the hypervisor, and the threshold for a given application can be set by the operating system.

For example, FIG. 2 shows an example where partition IDs 0, 1 and 2 have been respectively assigned maximum capacity thresholds of 50%, 50% and 40% respectively. Note that the sum of the maximum capacity thresholds defined for the different software execution environments may exceed 100%, because these are only maximum limits for the amount of the cache which can store data for a given partition ID, not a guaranteed allocation. In this case, the corresponding software execution environments will not all simultaneously use their maximum allocation.

Returning to FIG. 13, the cache 300 has a set of allocation counters 326 for tracking how many of the cache entries 304 have been allocated for data associated with each partition ID. Where security states are supported, the counters may be further partitioned based on security state. When a data value for a given partition ID is allocated to the cache, the corresponding allocation counter 326 is incremented. When data is invalidated, evicted or replaced, the allocation count for the corresponding partition ID is decremented. When a cache miss occurs in response to a given memory transaction, the cache controller 312 reads the allocation counter 326 and resource control parameter register 320 corresponding to the partition ID specified by the memory transaction, compares the allocation count with the maximum capacity threshold, and controls allocation based on the result of the comparison. If the current allocation has not yet exceeded the threshold, the required data may be allocated to the cache. However, if the allocation count is equal to or exceeds the threshold, the cache controller 312 may either determine not to allocate any data for the new request, or may evict or replace other data associated with the same partition ID from the cache before allocating the new data, to prevent the cache being allocated with greater than the threshold level of entries associated with that partition ID. If an eviction or replacement is required, the partition IDs 314 (and if provided, the victim selection information) stored in each entry of the cache can be used to determine what data evict. It will be appreciated that the above means of counting capacity is just one example and other techniques may also be used to track cache capacity.

The resource control parameter registers 320 may represent the maximum number of entries indicated by the maximum capacity threshold in different ways. For example, they could directly specify the maximum number of entries which can be allocated to the corresponding partition IDs data. Alternatively, they may specify the threshold in terms of a fraction of the total capacity of the cache which can be allocated for that partition ID. For example, the parameter may represent a scaled percentage where the parameter's width and scale factor are specified in an ID register 362 for the corresponding memory component. For example, a component may support 8-bit capacity controls scaled by 256, in which case, to allocate 30% of the capacity to a given partition, the partition's maximum capacity parameter would be 0.30*256=76.8, rounded down to 76 to prevent the allocation exceeding the desired percentage.

In embodiments where multiple security states are supported, the security state indication is also used to select the appropriate resource control parameter register 320 and allocation count 326, in combination with the partition ID.

Figure 14:
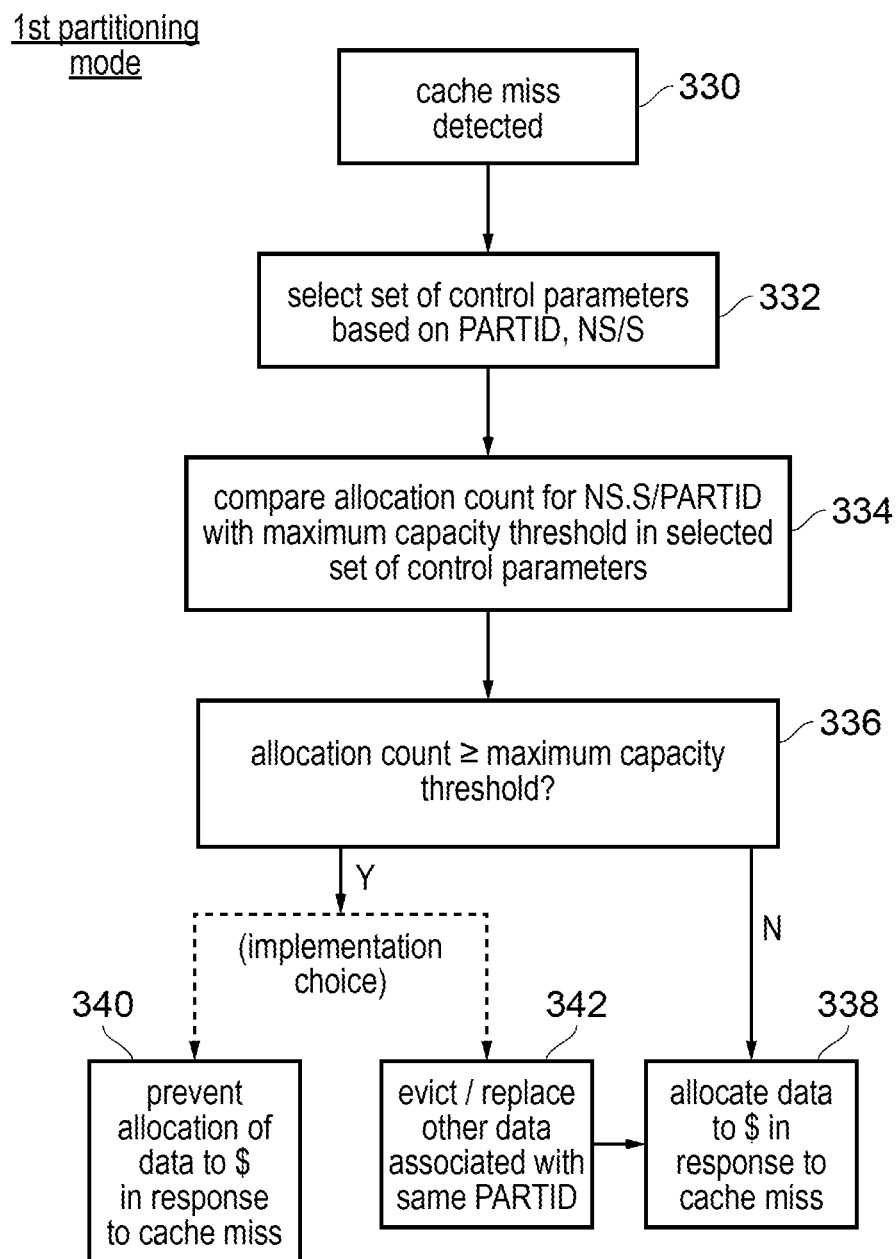
FIG. 14 is a flow diagram illustrating a method of controlling allocation to the cache in dependence on a capacity threshold selected in dependence on the partition identifier.

FIG. 14 shows a method of controlling cache allocation according to a maximum capacity threshold in the first partitioning control mode. At step 330, a cache miss is detected for a given memory transaction. At step 332 a set of resource control parameters 320 is selected based on the corresponding partition ID and security state. At step 334 the allocation count maintained by the counter 326 for the corresponding security state and partition ID is compared with the maximum capacity threshold in the selected set of resource control parameters 320, and at step 336 it is determined whether the allocation count is greater than the maximum capacity threshold. If not, then data for that request is allocated to the cache in response to the cache miss at step 338. On the other hand, if the allocation is greater than or equal to the allocation threshold then at step 340 allocation of the data to the cache is prevented or alternatively, at step 342 data associated with the same partition ID as the current request can be replaced or evicted to make way for the newly allocated data and the data can be allocated as normal at step 338 (the allocation count can sometimes exceed the threshold despite the limits provided by steps 340 or 342, e.g. if the threshold has recently been updated). Whether the method proceeds to step 340 or 342 is an implementation choice for a given implementation of cache.

Figure 15:
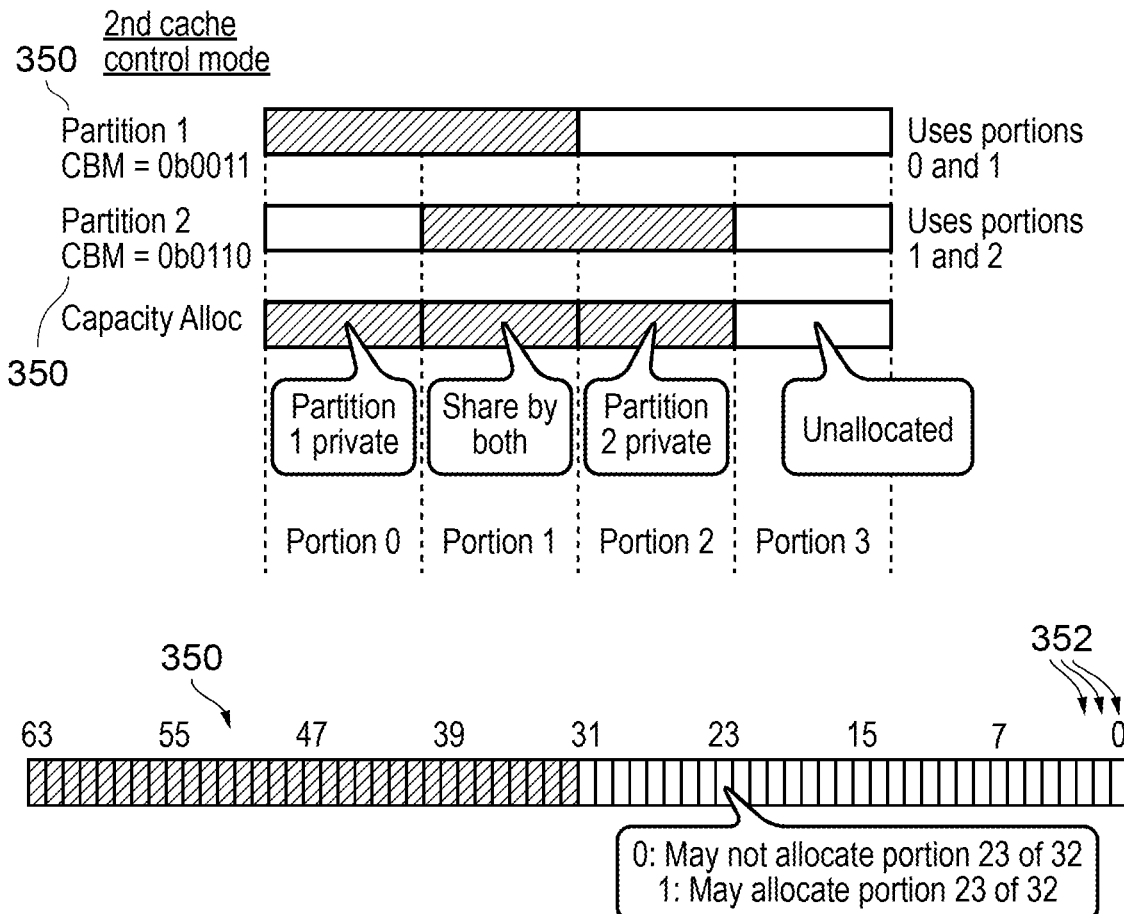
FIG. 15 illustrates an example of controlling which portions of the cache can be allocated with data in dependence on the partition identifier.

Alternatively, as shown in FIG. 15, a second cache control mode can be used in which a cache capacity portion bitmap 350 selected based on partition ID is used to control cache allocation. The bitmap 350 has multiple fields 352 which each specify whether a corresponding portion of the cache storage 302 is allowed to be allocated for storing data associated with the corresponding partition ID. For example, the bitmap 350 shown in the lower part of the example of FIG. 15 has 32 fields 352 each corresponding to $\frac{1}{32}^{nd}$ of the cache capacity. Each field may be set to 0 to indicate that the transactions specifying the corresponding partition ID cannot allocate data to that portion of the cache, or to 1 to indicate that the portion is allowed to be allocated with data for that partition ID.

As shown in the top part of FIG. 15, by setting different bitmaps 350 for different partition IDs, this allows some parts of the cache to be reserved for a given partition ID, while other parts may be shared among partition IDs or completely unallocated. For example, for the subset of 4 cache portions shown in FIG. 15 (this is not the whole cache capacity), portion 0 of the cache is allocated to partition 1 only, portion 1 is allocated to both partition 1 and partition 2 so that they may compete for allocations to this part of the cache, portion 2 is allocated to partition 2 only and portion 3 is not allocated to either of these partitions. Hence, when allocating data to the cache for partition 1 say, the cache controller 312 is restricted to selecting locations within portion 0 or 1, but cannot allocate to portions 2 or 3. The "portions" defined by the bitmap could be any group of one or more cache entries having the property that any given address can be allocated to at least one entry of the group, e.g. an entire way (including all sets belonging to that way) in a set-associative cache, or a more arbitrary subset of entries in a fully-associative cache.

Hence, with the second allocation control mode, when a cache miss is detected, again a set of control parameters for the corresponding partition ID and the security state is selected, but this time a cache bitmap is read and used to control which parts of the cache can be allocated with the data.

Some cache implementations may support only one of the first and second cache allocation control modes described above (e.g. a direct-mapped cache can implement the first mode but not the second mode). Other implementations may support the option to use both modes. For example, this could be useful because if the particular cache organization being used does not support giving many portions (e.g. a set-associative cache of relatively low associativity), then overlaying maximum capacity limits gives more control than portion partitioning alone.

As mentioned above, the cache 300 may have memory mapped configuration registers 360 for controlling how the resource partitioning is performed. The configuration registers 360 include an ID register 362 for identifying hardware capabilities of the cache 300, a selector register 364 for selecting a set of resource control parameters to update, and one or more configuration registers 366 for specifying the parameters to be written to the selected set of resource control parameters.

For example, the ID register 362 may specify which of the first/second cache allocation control modes are supported (threshold or bitmap based partitioning). For example, caches which do not have any allocation counters 326 may indicate that the first mode is not supported. In this case, the controlling processor may be restricted to using the second mode. Other caches may support both modes and have the flexibility to choose which is used for a given process. In this case, which mode to use may be specified within the resource control parameter register 320 for the corresponding partition ID, and programmed using the configuration registers 360.

When setting the set of resource control parameters for a given partition ID, software writes that partition ID to the selector register 364 and the parameters to be written to the corresponding configuration registers 366, by issuing memory transactions specifying the memory addresses mapped to those registers 364, 366. In response, the cache 300 reads the parameters from the configuration registers 366 and writes them to the corresponding resource control parameter register 320 identified by the relevant partition ID. When security states are supported, the selector register 364 and configuration registers 366 can be banked so that different versions are provided for the secure and less secure states respectively, with the security indication associated with the memory transaction selecting which set of registers is accessed.

Note that such a selector register 364 and configuration registers 366 to set the resource control parameters is just one example of how the resource control parameters could be set. The advantage of this approach is that it conserves address space usage in the memory system components. However, an alternative would be to use a wider interface where the array of control settings is exposed as an array of N control setting registers where N is the maximum number of partition IDs supported. This is simpler in that a control configuration can be updated for a partition with a single write and thus does not require mutual exclusion to prevent one processor accessing the selector register 364 and configuration registers 366 while another processor is configuring the memory system component. For example, if the maximum number of partition IDs is $2^{16}$ and a typical memory system component has 2 to 4 controls, this approach might use 256 KB of the address space for the array of resource control parameters.

Access to the memory mapped configuration registers 360 may be controlled by the MMU 70 for example, to limit which operating states can issue memory transactions for updating the configuration registers 360. For example, instructions executing at EL0 may not be allowed to access the configuration registers 360, but the hypervisor at EL2 may be allowed. When virtualisation of partition IDs is supported, the partition IDs used within the cache 300 are physical partition IDs, while an operating system attempting to set resource control parameters to be used for a partition ID of a corresponding application would specify a virtual partition ID. Therefore, to prevent the operating system updating the wrong resource control parameters, accesses to the addresses mapped to the configuration registers 360 may be trapped, and can trigger an exception to switch processing to the hypervisor at EL2. An exception handler in the hypervisor can then issue corresponding memory transactions with the correct physical partition ID to update the relevant set of parameters 320 at the cache 300. To achieve this, in a two stage MMU translation process, the address associated with the memory mapped registers 360 may be placed on a stage 2 address page which is different from other address space used by the memory system component.

In a similar way to the resource control partitioning, performance monitoring in the cache 300 may be partitioned based on the performance monitoring group (and partition ID in embodiments where the PMG is a sub-property of the partition ID) and the security state. A number of performance monitors 380 may be provided, each configurable to measure, count or calculate performance metrics based on filters programmed in a set of filter parameters 382 corresponding to that performance monitor 380. The filter parameters 382 may include fields for specifying a PARTID and PMG, and on receiving a memory transaction, if the filter parameters 382 have set a particular value for the PARTID/PMG fields then the performance monitor may determine whether to update its metric based on that transaction in dependence on whether the PARTID/PMG values associated with that transaction match the values set in the filter parameters 382. Note that in implementations supporting the first cache allocation mode, where allocation counters 326 are provided for tracking whether the allocation threshold is exceeded, the same allocation counters 326 may also be used for performance monitoring.

Where the cache 300 is an address translation cache, such as a TLB or page walk cache, the partitioning of cache allocation resources in this way can be useful to ensure that one software execution environment cannot allocate more than its allocated percentage/portions of the address translation cache capacity, to leave space for other software execution environments and reduce the "noisy neighbour" effect.

While FIG. 13 shows an example of a cache 300, other memory system components may have a similar set of memory mapped configuration registers 360 for configuring the memory system component parameters associated with a given partition ID/performance monitoring group/security state, and resource control parameter registers 320 for specifying sets of configuration data for corresponding partition IDs.

In particular, for other memory system components (such as a memory controller 24 or interconnect 14, 18 for example), any of the following forms of resource partitioning may be implemented:

Memory Channel Bandwidth Partitioning

The bandwidth of a main memory channel may be partitioned. Two bandwidth control schemes may be provided. A memory channel can optionally implement one or both of:
  Minimum bandwidth to which the partition has claim, even in the presence of contention
  Maximum bandwidth limit available to the partition in the presence of contention Any combination of these control schemes may be used simultaneously in a channel that supports them. Each control scheme is described in a section below.

Minimum Bandwidth Control Scheme

The minimum bandwidth control scheme gives requests from a partition preference when its current bandwidth is below the minimum and allows its requests to compete with other ordinary requests when it is above its minimum bandwidth. A partition's requests below its minimum bandwidth are thus most likely to get scheduled on the channel. The minimum bandwidth control scheme tracks memory bandwidth during an accounting period.
  If the bandwidth usage by the partition as tracked during the accounting period is currently less than the partition's minimum, its requests are preferentially selected to use channel bandwidth.
  If the bandwidth usage by the partition as tracked during the accounting period is currently greater than the partition's minimum, its requests compete with other ordinary preference requests to use bandwidth on the channel.

Bandwidth that is not used by a partition during an accounting window does not accumulate. A register within the memory system component may specify the minimum bandwidth limit for a given partition ID as scaled megabytes per second. The scaled value of megabytes per second is computed as the desired megabytes per second multiplied by a scale factor that may be defined by the hardware.

Maximum Bandwidth Limit Control Scheme

The maximum bandwidth limit control scheme gives a partition ordinary preference for up to its maximum bandwidth limit during an accounting period. If the bandwidth usage by the partition as tracked during the accounting period is currently less than the partition's maximum, its requests compete for scheduling on the memory channel with ordinary preference. If the bandwidth usage by the partition as tracked during the accounting period is currently greater than the partition's maximum bandwidth limit, its requests compete with other less preferred requests to use bandwidth on the channel.

The maximum bandwidth limit control scheme gives requests from a partition ordinary preference when the bandwidth usage is below the maximum bandwidth limit and non-preference when the bandwidth usage is over the maximum bandwidth limit. Thus in the absence of contention for channel bandwidth, the partition may use more than the maximum bandwidth. Requests for bandwidth when the partition's bandwidth usage is below its maximum limit are scheduled with ordinary priority, so depending on competing requests, not all of the partition's requested bandwidth below its maximum limit may be granted by the channel scheduler. Bandwidth that is not used by a partition during an accounting window does not accumulate.

Again, the control parameter for a maximum bandwidth limit may be specified as scaled megabytes per second. The scaled value of megabytes per second is computed as the desired megabytes per second multiplied by a scale factor that may be defined by the hardware.

If both the minimum bandwidth control scheme and the maximum bandwidth limit control scheme are implemented, the following table shows the preference of the request:

| If the utilized bandwidth is | | The preference is | Description |
| --- | --- | --- | --- |
| Below the minimum | | High | Only other High requests will delay this request* |
| Above the minimum | Below the maximum limit | Medium (ordinary) | High requests serviced first then compete with other Medium requests* |
| | Above the maximum limit | Low | Not serviced if any High or Medium requests are available* |

*Note that while the preference may generally be defined as High, Medium or Low to increase the likelihood that High preference requests are serviced ahead of Medium or Low preference requests, implementations may still deviate from preference order in servicing requests to meet other goals of the implementation, such as starvation avoidance.

For all of the schemes discussed above, the control parameters for bandwidth partitioning schemes can all be expressed in a given unit, e.g. megabytes per second. This value is also equivalent to bytes transferred per microsecond. An implementation may require that each bandwidth partitioning control parameter be multiplied by a constant scaling factor before the resulting value is programmed into one of a memory system component's bandwidth control registers for a partition ID. Whether the implementation requires a scaling of the control parameter, and the scaling factor if required, may be specified in a discovery register within the memory system component (similar to the discovery register 362 of the cache described above).

For all the memory bandwidth partitioning schemes described above, memory channel bandwidth regulation may occur over an accounting period. The accounting period may be either a fixed or moving window. The width of the window may be a discoverable constant which can be read from a discovery register in the memory system component. For example, the accounting period may be at least one microsecond and it may be up to 20 microseconds or more. Longer accounting periods may require more hardware especially in moving window implementations while shorter accounting periods may have more boundary effects, especially in fixed window implementations.

In fixed window accounting, bandwidth is apportioned to requests so that each partition gets bandwidth according to the minimum and maximum for that partition. Request or local priorities can be used to resolve conflicting requests for bandwidth. When the accounting window's period is reached, a new window begins with no history except for any queue of requests that have not been previously serviced. The new window starts accumulating bandwidth from zero for each of the partitions.

With moving window accounting, the moving window keeps a history of bandwidth by partition from all commands issued in the past window width. There is no resetting of the accounting of bandwidth per partition, rather bandwidth is added when a command is processed and removed from the accounting when that command moves out of the window's history. This continuous accounting is relatively free from boundary effects, but requires more hardware to track the history of commands within the window in addition to the bandwidth counters per partition ID required by the fixed window.

The minimum bandwidth allocations of all partitions may sum to more bandwidth than is available. This is not a problem when some partitions are not using their bandwidth allocations as unused allocations are available for other partitions to use. However, when minimum bandwidth is over allocated, the minimum bandwidth that is programmed for partitions cannot always be met. Software can ensure that minimum bandwidth is not over allocated to assure that minimum bandwidth allocation programmed can be reliably delivered by the system.

Because available bandwidth may depend on one or more clock frequencies in many systems, for example DDR clock, software may wish to reallocate bandwidths when changing clocks that affect the bandwidth available. Lowering clock rates without changing allocations may result in over-allocation of bandwidth. Note: The available bandwidth on a DRAM channel is not a constant, but varies with the clock rate, the mix of reads and writes and the bank hit rate.

One skilled in the art will see that bandwidth controls of the types described are not limited to being used only at memory channel controllers, but may be deployed to control bandwidths at any memory system component.

Priority Partitioning

Unlike the other memory system resources listed in this document, priority doesn't directly affect the allocation of memory system resources, but instead has an effect on conflicts that arise for access to resources. A properly configured system should rarely have substantial performance effects due to prioritization, but priority does play an important role in oversubscribed situations whether instantaneous or sustained. Therefore, "priority partitioning" can be used as a tool to aid in isolating memory system effects between partitions.

A partition may be assigned priorities at each component in the memory system (that supports priority partitioning). This partitioning control allows different parts of the memory system to be set up to handle requests with different priorities. For example, requests from a processor to the system cache may be set to use a higher transport priority than those from the system cache to main memory.

Two types of priorities may be identified for each partition ID:

Internal priorities control priorities used in the internal operation of this memory system component. They can be used within the memory system component to prioritize internal operations. For example, a memory controller may use an internal priority to choose between waiting requests when bandwidth allocation doesn't pick a clear winner.

Downstream priorities control priorities communicated downstream to another memory system component (for example to an interconnect or memory controller). "Downstream" refers to the communication direction for requests. An "upstream" response usually uses the same transport priority as the request that generated it. A memory system component uses a downstream priority to indicate priority to a downstream component that does not have priority partitioning. This may be used to set transport priorities for an interconnect component that is downstream.

On the other hand, if a component doesn't implement priority partitioning, or it doesn't implement downstream priorities, it may use a "through priority"—the downstream priority is the same as the incoming (upstream) priority or requests. Similarly, the priority of a response that transits through a memory system component (from downstream to upstream) is the same priority as the response received (from downstream).

More generally, in accordance with one example configuration there is provided an apparatus comprising: processing circuitry to perform data processing in response to instructions of one of a plurality of software execution environments; at least one memory system component to handle memory transactions for accessing data, each memory transaction specifying a partition identifier allocated to a software execution environment associated with said memory transaction, said at least one memory system component being configured to select one of a plurality of sets of memory transaction progression parameters associated with said partition identifier specified by a memory transaction to be handled; and memory transaction progression control circuitry to control progression of said memory transaction in dependence on said selected set of memory transaction progression parameters.

In the above example, there are a number of software execution environments. These might include applications, operating systems, and virtual machines. Each of the environments has access to a same memory system. The memory system can include a main memory and can also include one or more caches. The caches (if present) can be arranged in a hierarchy so that smaller, faster caches are accessed before bigger, slower caches are accessed, before main memory (if present) is accessed. In some examples, parts (or all) of the memory system could be shared, with some parts of the memory system only being available to certain components. Each memory transaction, which accesses data from the memory system, specifies a partition identifier. The partition identifier that is provided depends on the environment that issued the memory transaction. For example, each environment might be assigned its own partition identifier (or partition identifiers), one of which is provided in respect of each memory transaction. Memory transaction progression control circuitry then controls progression of the memory transaction based on the partition identifier by selecting memory transaction progression parameters (also referred to as "memory system component partitioning control settings") associated with the transaction identifier. In this way, it is possible to give direct control over a set of resources. Doing so can be easier to perceive, makes it possible to control the set of resources in such a way that the effect is clear, and makes it possible to connect the resources to a measureable behaviour of the software environment. Note that the memory transaction progression control circuitry could be a separate device, could be connected to the at least one memory system component, or could be the at least one memory system component itself.

In some embodiments, said set of memory transaction progression parameters comprises a priority configuration to indicate a priority with which said memory transaction is to be handled. Higher priority transactions are treated with more importance, and so potentially transmitted more quickly, than lower priority transactions. Priority is frequently expressed as a number. Note, however, that the terms "higher" and "lower" refer to the relative importance of the transaction and not any numerical value associated with the transaction. Accordingly, a high priority transaction could be associated with the numerical value '0' and a low priority transaction could be associated with the numerical value '9'. By expressing a priority associated with a transaction, it is possible to resolve timing conflicts when multiple transactions are otherwise tied as to which should be allowed to proceed. Optionally, priority could also be used to express whether or not resources should be expended on resolving the transaction or the extent to which that transaction should be prioritised over other transactions. For example, transactions associated with some partition identifiers could be enabled to progress more quickly than transactions with other partition identifiers. In this way, software execution environments that are not to be held back can have their memory transactions progress more quickly than other software execution environments.

In some embodiments, said priority configuration comprises an internal priority; and said at least one memory system component is to handle said memory transaction at said internal priority. The internal priority relates to the priority at which the at least one memory system component itself handles the memory transaction. In some embodiments, the internal priority replaces any incoming priority (e.g. which might be based on the bus QoS priority for the transaction).

In some embodiments, said priority configuration comprises a downstream priority at which said memory transaction is to be handled. Memory system components typically pass transactions downstream until the transaction reaches a memory system component that is able to handle the transaction—e.g. by providing access to the requested data. In a typical memory hierarchy, downstream can be considered to be towards a main memory. By providing a specific downstream priority at which the memory transaction is to be handled, it is possible to alter the priority of the transaction as the transaction passes through more elements of the memory system. Similarly, in this manner, it is possible for a memory system component, other than the one that performed the selection, to be controlled to handle the transaction at a given priority. The downstream priority may, in some embodiments, override or replaces any incoming priority. Downstream priority can also be used as a mechanism for interfacing with older memory system components that implement support for Quality-of-Service (QoS) as a parameter.

Alternatively, rather than specifying the priority level at which the transaction should be handled, it is possible to merely state that the priority level should remain unchanged. Again, in such cases, it is possible to control memory system components without actively having those components perform the selection. In particular, in such embodiments, when said at least one memory system component passes said memory transaction to at least one other downstream memory system component, said transaction is passed with an indication that said memory transaction is to be handled at a same priority that a memory system component that selected said one of a plurality of sets of memory transaction progression parameters handled said memory transaction.

In some embodiments, said set of memory transaction progression parameters comprises a plurality of priority configurations, each associated with one of said at least one memory system component; and each of said at least one memory system component is to handle said memory transaction in accordance with that associated priority configuration. In such a manner, it is possible to have a different priority configuration for each of the memory system components, thereby providing increased flexibility over how the transaction is handled as it progresses through the memory system. For example, for some applications, it could be the case that short delays are acceptable and even appropriate, given other competing applications on the same system. It could therefore be appropriate to assign a low priority to such execution environments in perhaps of nearby (upstream memory system components). However, if it is undesirable to permit long delays, then a higher priority could be assigned for other system components. In this way, a short delay could be caused in order to priority memory transactions from other execution environments. However, longer delays are discouraged, since other memory system components have an increased priority.

In some embodiments, said set of memory transaction progression parameters comprises a limit associated with said at least one memory system component. The limit could, for example, by in respect of a resource associated with that at least one memory system component, which is used up during the handling and/or passing on of memory transactions. Note that the limits associated with each partition need not add up to the total quantity of that resource actually implemented, provisioned, or possible to allocate. Indeed, the total sum of the limits could fall under the actual limit thereby enabling some slack, or could exceed the actual limit, in which case the resource is shared between the competing partitions and at some times or under some conditions of competing requests, some of the allocations may not be met. Such sharing could be equal, could be weighted in favour of the allocations, or could be allocated in entirety to the first requesting environment, with the remainder being shared between other requesting environments.

For example, in some embodiments, said limit is a bandwidth limit of said at least one memory system component. The bandwidth could be expressed as an amount of data transferred in, out, or in and out of the at least one memory system component over a period of time. In other examples, the bandwidth could be expressed as a percentage of the channel's theoretical maximum bandwidth, or a rate of bytes transferred measured over a fixed period, or opportunity to consume the theoretical maximum bandwidth of the channel that actual requests have consumed by the actual, less-efficient transfers made. A current bandwidth can be considered to be a measurement of the expressed bandwidth over a time period (e.g. one or more microseconds or a number of minutes).

In some embodiments, the bandwidth limit can comprise a maximum bandwidth. For example, in some embodiments, when a current bandwidth usage of said memory system component for responding to transactions specifying said associated partition identifier exceeds said maximum bandwidth, said memory transaction progression control circuitry is to reduce a preference for access to bandwidth of transactions specifying said associated partition identifier. In this (and some other) examples, the maximum bandwidth need not be an absolute limit, but rather a point at which the transactions are given a lower preference for access to bandwidth than other transactions associated with transactions that have not exceeded the maximum bandwidth. Of course, the maximum bandwidth can differ between partitions such that some partitions are given access to more bandwidth than other partitions.

In another example, the bandwidth limit can comprise a minimum bandwidth. For example, in some embodiments, when a current bandwidth usage of said memory system component for responding to transactions specifying said associated partition identifier is below said minimum bandwidth, said memory transaction progression control circuitry increases a preference of transactions specifying said associated partition identifier. In such example embodiments, the minimum bandwidth limit acts not as a requirement, but as a bandwidth for which the partition receives high preference. High preference requests can be expected to be serviced unless there are more such requests than the bandwidth available. To achieve this, if a partition has not met the minimum bandwidth, any transactions that identify that partition are given a higher preference than transactions identifying partitions that have met their minimum bandwidth. Of course, the minimum bandwidth can differ between partitions such that some partitions are given access to more bandwidth than other partitions.

In yet another example, said bandwidth limit comprises a lower limit and a higher limit, said lower limit being lower than said higher limit; said memory transaction routing control circuitry is to set a preference of a transaction specifying a given partition identifier based on a current bandwidth usage of said memory system component for responding to transactions specifying said given partition identifier, wherein when said current bandwidth usage is below said lower limit, said memory transaction routing control circuitry sets a preference of said transactions specifying said given partition identifier to a first level; when said current bandwidth usage is between said lower limit and said higher limit, said memory transaction routing control circuitry sets a preference of said transactions specifying said given partition identifier to a second level, of lower importance than said first level; and when said current bandwidth usage is above said upper limit, said memory transaction routing control circuitry sets a preference of said transactions specifying said given partition identifier to a third level, of lower importance than said second level. In such embodiments, at least three different levels of preference are provided—a first level, a second level higher than the first level, and a third level higher than the second level. Two bandwidth limits are then provided—a minimum bandwidth limit and a maximum bandwidth limit. When the minimum bandwidth limit for a partition has not been met, transactions specifying that partition identifier are given the third (higher) preference level and therefore given preference for bandwidth over transactions with the second or first preference. Otherwise, if the maximum bandwidth limit for the partition has not been met, transactions specifying that partition identifier are given the second preference level and are therefore given preference for bandwidth over transactions with the first preference. Otherwise, if the maximum bandwidth limit for the partition has been met, transactions specifying that partition identifier are given the first preference level. In this way, a partition is always able to issue a transaction. However, those partitions that have not met the lower (minimum) bandwidth limit are given more preference, whilst those partitions that have exceeded the (maximum) bandwidth limit are given less preference.

In some embodiments, said limit is an outstanding transactions limit of said at least one memory system component; and said at least one memory system component is configured to limit a number of outstanding transactions associated with said partition identifier to other memory system components to said outstanding transactions limit. An outstanding transaction can be considered to be a transaction that has been forwarded (i.e. downstream) by a memory system component, for which a result has not yet been returned. Such transactions are often referred to as being "in flight". In these embodiments, a certain number of "in flight" transactions could be permitted for each partition. Transactions that would cause the limit to be exceeded can be "held" until such time as the number of in flight transactions drops below the limit, at which point they are forwarded downstream (and thereby become outstanding/in-flight). This could, for example, be implemented using a counter, as described later.

In some embodiments, said at least one memory component comprises a buffer for issued transactions; and said limit is a buffer depth of said buffer. A buffer can be used by a memory system component to hold a number of incoming transactions (e.g. by the processing circuitry or by I/O) prior to being processed by that memory system component (either by responding to the transaction, or by forwarding the transaction further downstream). For example, in an interconnect, which is an example of a memory system component, there might be one or more buffers. Each buffer can have its own depth (size) measured in terms of a number of transactions and each partition can be allocated a particular number of entries in that buffer.

In some embodiments, said limit is a number of transactions that can be transmitted in an unmaskable state such that they are not blocked by other transactions. Some transactions could be marked as being unmaskable. For example, such transactions could be such that they cannot be blocked by other transactions. This can be used to create "virtual channels". Unmaskable transactions would expect to be resolved quickly, since they would not have to wait for other transactions to be resolved (except perhaps other unmaskable transactions). However, clearly not all transactions can have such a status, or the status would become meaningless. Hence, it could be desirable to limit access to the ability to send such transactions.

There are a number of ways in which the usage against a limit can be determined. However, in one embodiment, the apparatus further comprises: a counter to count usage of a resource limited by said limit; and said counter resets every predetermined period of time. Such a system provides a "static window", which resets every period of time, and the usage against the limit is counted during each window.

In other embodiments, there is provided a counter to count usage of a resource limited by said limit over a preceding predetermined period of time. Such a "floating window" can therefore be used in order to more accurately measure the current usage by taking recent history into account. In contrast, although a static window might be easier to implement, it loses all history every predetermined period of time.

Figure 16:
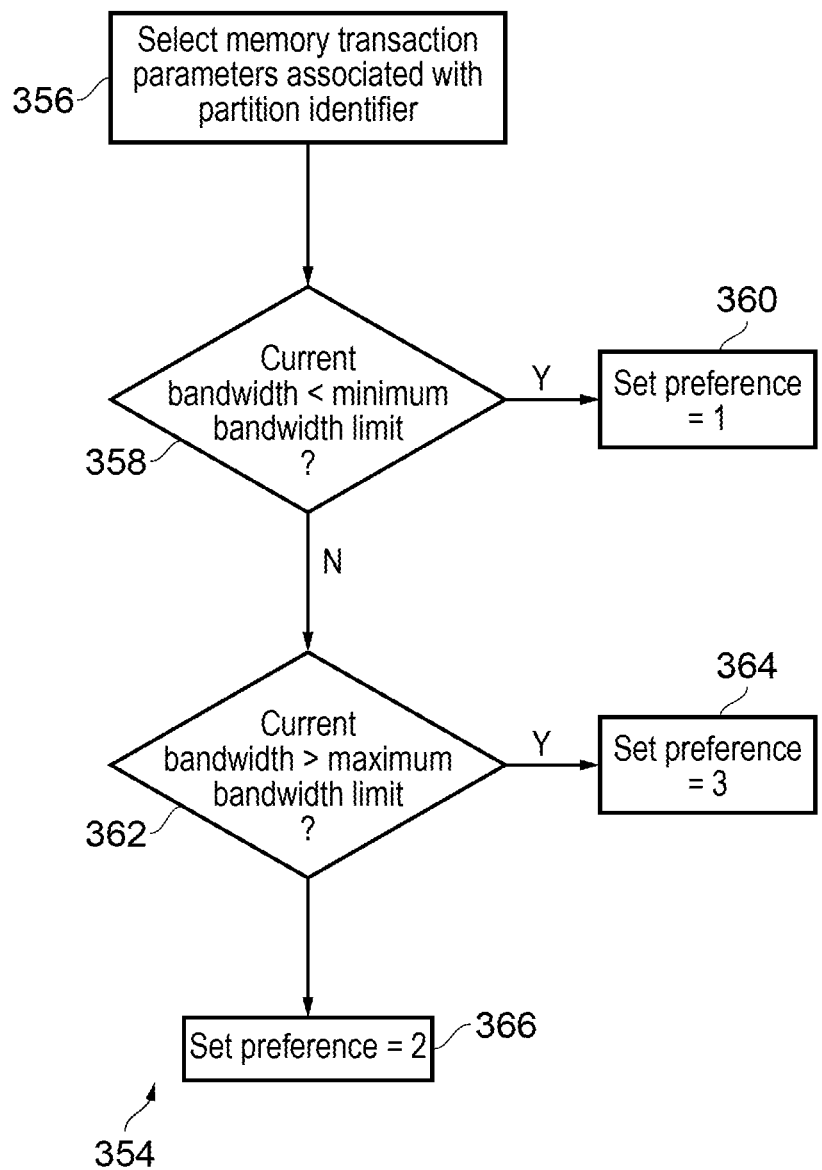
FIG. 16 shows, in flow chart form, a process for selecting a preference for a memory transaction based on limits set by a partition identifier.

FIG. 16 shows a flow chart 354 that illustrates a process for selecting a preference for a memory transaction based on limits set by a partition identifier. In a step 356, a next transaction that is selected is analysed and it is determined which partition identifier is referred to by the memory transaction. This identifier is then used to select memory transaction parameters. In this embodiment, the memory transaction parameters express bandwidth limits. At step 358, it is determined whether a current bandwidth (i.e. the bandwidth used by memory transactions having the same partition identifier) is less than a minimum bandwidth limit in the associated memory transaction parameters. If so, then at step 360, the preference is set to 1 (high) since the partition has not yet met its minimum allocation of bandwidth. Otherwise, at step 362, it is determined whether the current bandwidth is greater than the maximum bandwidth limit in the associated memory transaction parameters. If so, then at step 364, the preference of the memory transaction is set to 3 (low) since the partition has exceeded the maximum bandwidth allocated to it. Note that the memory transaction is still permitted to proceed, but will treated with low preference and may therefore only be able to proceed if no other transactions with a higher preference need to be handled. Otherwise, the partition has exceeded its minimum allowance, but not its maximum allowance and so the transaction is given a preference of 2 (middle) at step 366. As a consequence of this process, a partition whose associated transactions are not allocated access to bandwidth experiences a reduction in its current bandwidth usage. The transactions are therefore not blocked, but instead their bandwidth consumption is delayed.

Figure 17:
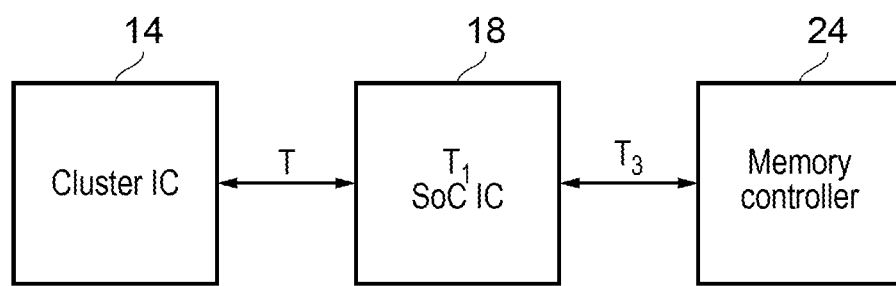
FIG. 17 schematically illustrates a memory system passing a transaction.

FIG. 17 schematically illustrates a memory system passing a transaction T. The transaction is passed from a cluster interconnect 14 to a system-on-chip (SoC) interconnect 18, to a memory controller 24. In this embodiment, the SoC interconnect 18 performs the selection of the memory transaction parameters based on the partition identifier provided by the transaction T. In this embodiment, a first preference (1) is provided for internal handling of the transaction at the SoC interconnect 18. Accordingly, in determining whether the transaction can be handled, SoC interconnect 18 itself gives high preference to the transaction. However, if the SoC interconnect 18 determines that the transaction must be passed downstream, the transaction is passed together with a second preference (3), with which the memory controller 24 will handle the transaction. In this way, it is possible to control the preference with which a transaction is handled by a memory system component that does not perform the selection of the memory transaction parameters.

Figure 18:
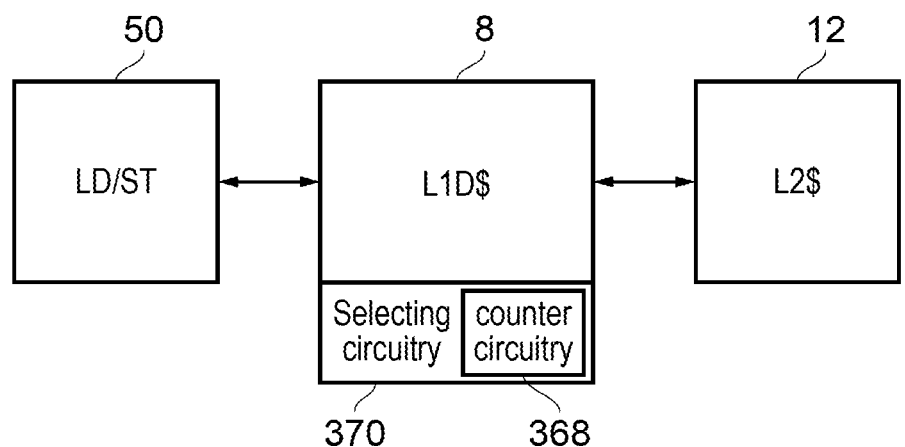
FIG. 18 schematically illustrates the use of counter circuitry in measuring usage against a limit.

FIG. 18 schematically illustrates the use of counter circuitry 368 in measuring usage against a limit. For example, the measurement could be for outstanding transactions, which is compared to a limit (of outstanding transactions). In this embodiment, the selection circuitry 370 is provided as a separate component to the memory system component, i.e. the level 1 data cache 8. However, it will be appreciated that in other embodiments, the selection circuitry could be the memory system component itself. Also in this embodiment, the selection circuitry 370 uses a counter circuitry 368 to keep track of the number of outstanding transactions that have been issued in respect of each partition identifier. In this embodiment, a transaction is considered to be outstanding by a component if that component has forwarded the transaction onwards (i.e. downstream) but has not yet received a response to the transaction. Consequently, each time a transaction is forwarded, the counter associated with the partition specified by that transaction is incremented and each time a response is received, the counter in respect of the associated partition identifier is decremented. When a new transaction is to be forwarded downstream that specifies a partition identifier, the counter for that partition identifier can be compared against the limit of outstanding transactions for that partition identifier. If the limit is met or exceeded, the transaction will not be forwarded until such time as the counter falls below the limit, which happens when a response is received so that one of the outstanding transactions is no longer outstanding. Hence, the transaction will effectively be "held" without being forwarded.

In the above example, the counter simply tracks the number of transactions that are currently outstanding. However, in other embodiments, the counter is associated with a period of time. For example, the counter and limit could be directed towards data transferred over a period of time. In such example embodiments, the counter could be reset every period of time, thereby providing a "static window" or the counter could measure usage against a limit over a previous period of time, thereby providing a "floating window". In the former case, it is possible for the limit to be reached very quickly as compared to the length of the window, which can lead to "bursty" behaviour. In the latter case, by measuring usage over a preceding period of time, a small amount of the allocation is continually freed up, which might be expected to lead to a more gentle/continual/predictable usage.

Figure 19:
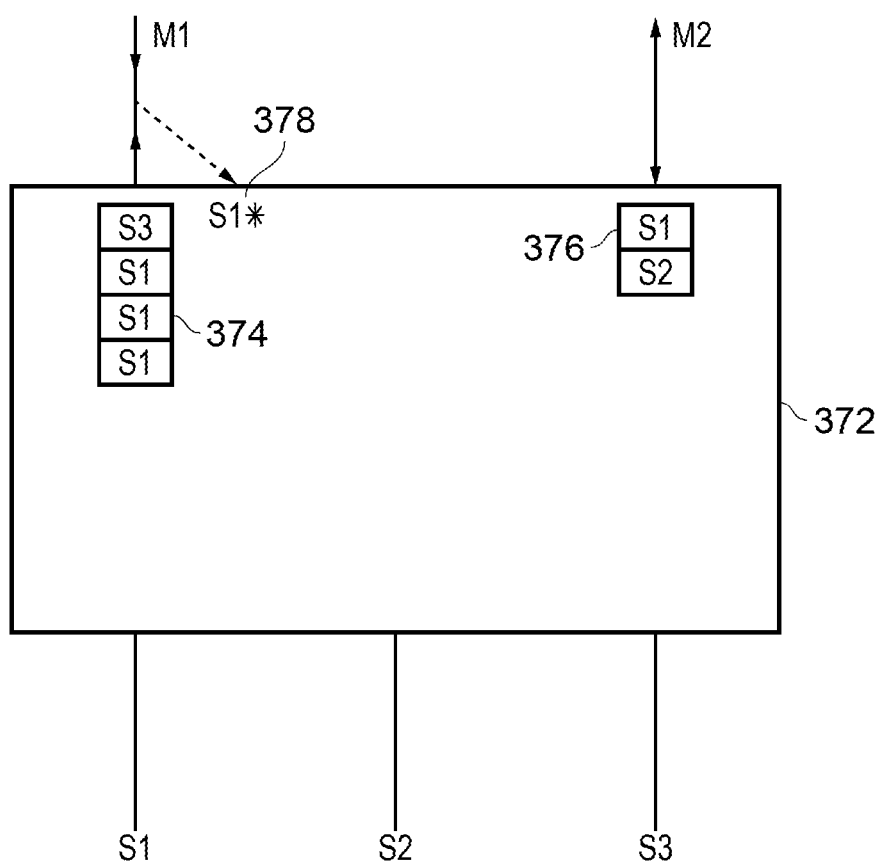
FIG. 19 shows a memory system component's use of a buffer for memory transactions.

FIG. 19 shows a memory system component 372, in this case an interconnect, using one or more buffers 374, 376 for memory transactions. An interconnect is used to enable one or more masters (M1, M2), that issue memory transactions, to access one or more slaves (S1, S2, S3), with at least one slave device being shared between the masters. The interconnect has one or more buffers 374, 376 each associated with each master, which queues transactions until they can be sent/received/completed by the relevant slave. A quantity of buffer storage can be allocated up to a limit for use by a partition. In FIG. 19, each transaction is represented by the target slave device for that transaction. Transactions in the queue are stalled or blocked if the transaction at the front of the queue is unable to be transmitted to the slave due to that slave being busy (potentially engaged in another transaction from another master). For example, the front transaction in the buffer 374 of master 1 is directed to slave S1. However, if S1 is busy, then the transaction cannot proceed and so other transactions in that buffer 374 will be blocked. Meanwhile, the transaction in the front of the buffer 376 associated with the second master M2 may be able to proceed. In this embodiment, the masters are processors, each of which provides multiple execution environments. Each execution environment is associated with a partition, and the partitions have an associated buffer depth limit. Also in this embodiment, master 1 is shown to execute a non-blocking transaction 378 directed towards S1. In this embodiment, a non-blocking transaction is such that it always moves to the front of the buffer and also cause blocking transactions to be cancelled so that it can proceed immediately without being blocked. The number of non-blocking transactions that can be issued in respect of each partition is another example of a limit that can be associated with each partition.

The blocking behaviour that occurs in an interconnect can also be handled in a different way using the present technique, in particular by the implementation of one or more virtual channels. A virtual channel provides transport that behaves almost as if it were a separate channel. This could, for instance, be implemented by transmitting some of the transactions in an unmaskable state such that they will not be blocked by other transactions. For example, a single physical channel could be treated as two virtual channels and applying the unmaskable state when a transaction is to be sent via a virtual channel that is not blocked but via a physical channel that is blocked.

Figure 20:
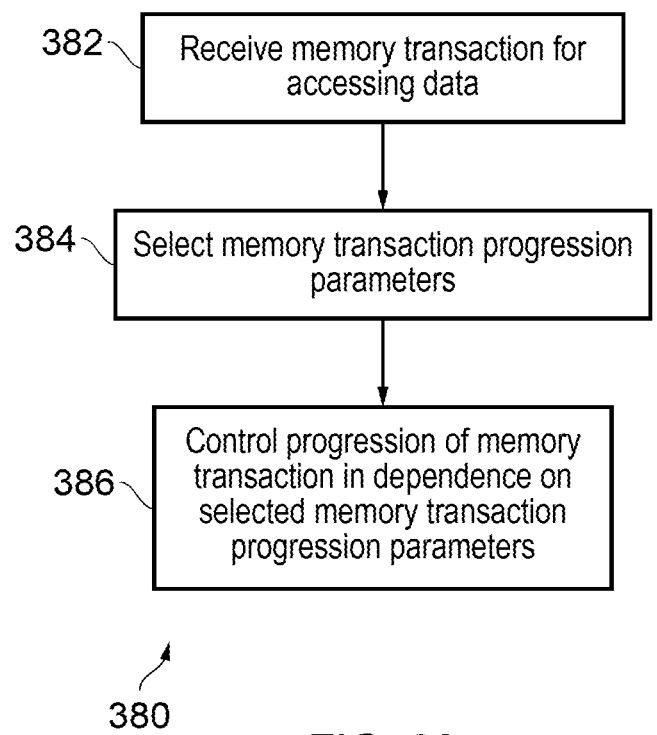
FIG. 20 shows, in flow chart form, a process for performing data processing based on partition identifiers.

FIG. 20 shows a flow chart 380 that illustrates a process for performing data processing based on partition identifiers. At a step 382, a memory transaction for accessing data is received. At step 384, memory transaction progression parameters are selected according to the partition identifier specified by the memory transaction. At a step 386, the progression of the memory transaction is controlled in dependence on the selected memory transaction progression parameters. In this way, each partition is able to have control over the way in which transactions issued by that partition are progressed through the memory system, having concern for matters such as priority or bandwidth.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus comprising:
   processing circuitry to process instructions;
   at least one memory system component to handle memory transactions for accessing data; and
   partition identifier storage configured to store a plurality of instruction partition identifiers and a plurality of data partition identifiers corresponding to respective operating states of the processing circuitry;
   wherein when issuing a memory transaction for accessing data, the processing circuitry is configured to issue the memory transaction specifying a partition identifier dependent on a selected data partition identifier stored in the partition identifier storage, the selected data partition identifier being selected in dependence on a current operating state of the processing circuitry;
   when issuing a memory transaction for accessing an instruction, the processing circuitry is configured to issue the memory transaction specifying a partition identifier dependent on a selected instruction partition identifier stored in the partition identifier storage, the selected instruction partition identifier being selected in dependence on a current operating state of the processing circuitry; and
   in response to a memory transaction to be handled, said at least one memory system component is configured to control allocation of resources for handling the memory transaction or manage contention for said resources in dependence on a selected set of memory system component parameters selected in dependence on the partition identifier specified by the memory transaction, or to control, in dependence on said partition identifier, whether performance monitoring data is updated in response to the memory transaction.

2. The apparatus according to claim 1, wherein in response to a memory transaction specifying a given value of the partition identifier, said at least one memory system component is configured to select said selected set of memory system component parameters corresponding to said given value of the partition identifier regardless of whether the memory transaction is for accessing an instruction or for accessing data.

3. The apparatus according to claim 1, comprising a memory management unit comprising a translation lookaside buffer to store address mapping information for translating addresses specified by memory transactions;
   wherein in response to a memory transaction for which a miss is detected in the address translation cache, the memory management unit is configured to issue a walk transaction to trigger allocation of address mapping information from a memory system to the translation lookaside buffer, the walk transaction specifying the same partition identifier as the memory transaction for which the miss is detected.

4. The apparatus according to claim 1, wherein said at least one memory system component comprises at least one of:
a cache;
a memory management unit;
an interconnect; and
a memory controller.

5. The apparatus according to claim 1, wherein said at least one memory system component comprises a cache configured to control allocation of data to the cache in response to the memory transaction in dependence on the selected set of memory system component parameters.

6. The apparatus according to claim 1, wherein said at least one memory system component comprises an interconnect or memory controller configured to control allocation of bandwidth for handling said memory transaction in dependence on the selected set of memory system component parameters.

7. An apparatus comprising:
processing circuitry to process instructions;
at least one memory system component to handle memory transactions for accessing data; and
partition identifier storage to store an instruction partition identifier and a data partition identifier;
wherein when issuing a memory transaction for accessing data, the processing circuitry is configured to issue the memory transaction specifying a partition identifier dependent on the data partition identifier stored in the partition identifier storage;
when issuing a memory transaction for accessing an instruction, the processing circuitry is configured to issue the memory transaction specifying a partition identifier dependent on the instruction partition identifier stored in the partition identifier storage; and
in response to a memory transaction to be handled, said at least one memory system component is configured to control allocation of resources for handling the memory transaction or manage contention for said resources in dependence on a selected set of memory system component parameters selected in dependence on the partition identifier specified by the memory transaction, or to control, in dependence on said partition identifier, whether performance monitoring data is updated in response to the memory transaction;
wherein the partition identifier storage is configured to store a performance monitoring partition identifier; and
the processing circuitry is configured to issue the memory transaction specifying a first partition identifier dependent on the data partition identifier when the memory transaction is for accessing data and dependent on the instruction partition identifier when the memory transaction is for accessing an instruction, and a second partition identifier dependent on the performance monitoring partition identifier.

8. The apparatus according to claim 7, wherein said at least one memory system component is configured to support at least one of memory system resource partitioning and performance monitoring partitioning;
when the at least one memory system component supports memory system resource partitioning, the memory system component is configured to control allocation of resources for handling said memory transaction or manage contention for said resources in dependence on the selected set of memory system component parameters selected in dependence on the first partition identifier; and
when the at least one memory system component supports performance monitoring partitioning, the memory system component is configured to control, in dependence on at least said second partition identifier, whether performance monitoring data is updated in response to the memory transaction.

9. The apparatus according to claim 8, wherein when the at least one memory system component supports performance monitoring partitioning, the memory system component is configured to control, in dependence on both said first partition identifier and said second partition identifier, whether performance monitoring data is updated in response to the memory transaction.

10. A data processing method comprising:
processing instructions;
storing a plurality of instruction partition identifiers and a plurality of data partition identifiers in partition identifier storage;
issuing a memory transaction to at least one memory system component, the memory transaction specifying a partition identifier dependent on a selected instruction partition identifier when the memory transaction is for accessing an instruction and dependent on a selected data partition identifier when the memory transaction is for accessing data, wherein the selected instruction partition identifier and the selected data partition identifier are selected in dependence on a current operating state in which said instructions are being processed; and
in response to a memory transaction to be handled, said at least one memory system component controlling allocation of resources for handling the memory transaction or managing contention for said resources in dependence on a selected set of memory system component parameters selected in dependence on the partition identifier specified by the memory transaction, or controlling, in dependence on said partition identifier, whether performance monitoring data is updated in response to the memory transaction.

\* \* \* \* \*